(12) United States Patent
Hinterberger et al.

(10) Patent No.: US 11,289,741 B2
(45) Date of Patent: Mar. 29, 2022

(54) DISCHARGING A BATTERY MODULE, HAVING AT LEAST TWO BATTERY CELLS, OF A BATTERY HAVING AT LEAST TWO BATTERY MODULES

(71) Applicant: AUDI AG, Ingolstadt (DE)

(72) Inventors: Michael Hinterberger, Großmehring (DE); Berthold Hellenthal, Schwanstetten (DE); Heinz-Willi Vassen, Buxheim (DE); Peter Pilgram, Neuburg an der Donau (DE)

(73) Assignee: AUDI AG, Ingolstadt (DE)

( * ) Notice: Subject to any disclaimer, the term of this patent is extended or adjusted under 35 U.S.C. 154(b) by 349 days.

(21) Appl. No.: 16/465,734

(22) PCT Filed: Nov. 16, 2017

(86) PCT No.: PCT/EP2017/079468
§ 371 (c)(1),
(2) Date: May 31, 2019

(87) PCT Pub. No.: WO2018/099731
PCT Pub. Date: Jun. 7, 2018

(65) Prior Publication Data
US 2019/0299799 A1    Oct. 3, 2019

(30) Foreign Application Priority Data

Dec. 2, 2016 (DE) ...................... 10 2016 224 002.1

(51) Int. Cl.
*H01M 10/44* (2006.01)
*B60L 50/64* (2019.01)
(Continued)

(52) U.S. Cl.
CPC ............. *H01M 10/44* (2013.01); *B60L 50/64* (2019.02); *B60L 58/13* (2019.02);
(Continued)

(58) Field of Classification Search
CPC .. H01M 10/44; H01M 50/502; H01M 50/572; H01M 2010/4278; H01M 2220/20
See application file for complete search history.

(56) References Cited

U.S. PATENT DOCUMENTS

2012/0306452 A1* 12/2012 Christensen ........ H01M 10/443
320/136

FOREIGN PATENT DOCUMENTS

CN        102025129 A      4/2011
DE    102013204539 A1      9/2014
(Continued)

OTHER PUBLICATIONS

Office Action dated Nov. 23, 2020 in corresponding Korean Application No. 10-2019-7016986; 8 pages including English-language translation.
(Continued)

*Primary Examiner* — Jane J Rhee
(74) *Attorney, Agent, or Firm* — Maier & Maier, PLLC

(57) ABSTRACT

A method for discharging a battery module, having at least two battery cells, of a battery having at least two battery modules, wherein the battery cells of each of the battery modules are arranged next to one another and are mechanically and electrically connected to one another, wherein, in each of the battery modules, the respective battery cells are individually activated and deactivated in terms of an energy storage function by a cell switch unit, wherein the battery cells of the battery module to be discharged are selectively electrically coupled successively to a discharge device by the cell switch unit and starting from one predefined battery cell, in order to individually successively electrically discharge the battery cells in order to discharge the battery module.

20 Claims, 16 Drawing Sheets

(51) Int. Cl.
*B60L 58/13* (2019.01)
*H02J 7/00* (2006.01)
*H02J 7/34* (2006.01)
*H01M 50/502* (2021.01)
*H01M 50/572* (2021.01)
*H01M 10/42* (2006.01)

(52) U.S. Cl.
CPC ....... *H01M 50/502* (2021.01); *H01M 50/572* (2021.01); *H02J 7/00* (2013.01); *H02J 7/342* (2020.01); *H01M 2010/4278* (2013.01); *H01M 2220/20* (2013.01); *H02J 2007/0067* (2013.01)

(56) References Cited

FOREIGN PATENT DOCUMENTS

| | | |
|---|---|---|
| DE | 102013206191 A1 | 10/2014 |
| DE | 102014205116 A1 | 9/2015 |
| DE | 102014212122 A1 | 1/2016 |
| DE | 102015002154 A1 | 8/2016 |
| EP | 2355229 A1 | 8/2011 |
| JP | 2010-182579 A | 8/2010 |
| JP | 2013-230003 A | 11/2013 |
| WO | 2013044917 A2 | 4/2013 |
| WO | 2013/131595 A1 | 9/2013 |

OTHER PUBLICATIONS

Notification of Transmittal of Translation of the International Preliminary Report on Patentability dated Jun. 6, 2019, in connection with corresponding international Application No. PCT/EP2017/079468 (5 pgs.).

German Search Report dated Oct. 4, 2017 in corresponding German Application No. 10 2016 224 002.1; 20 pages.

International Search Report and Written Opinion dated Jan. 25, 2018 in corresponding International Application No. PCT/EP2017/079468; 24 pages.

Office Action dated Sep. 3, 2021, in connection with corresponding Chinese Application No. 201780074533.6 (15 pp., including machine-generated English translation).

\* cited by examiner

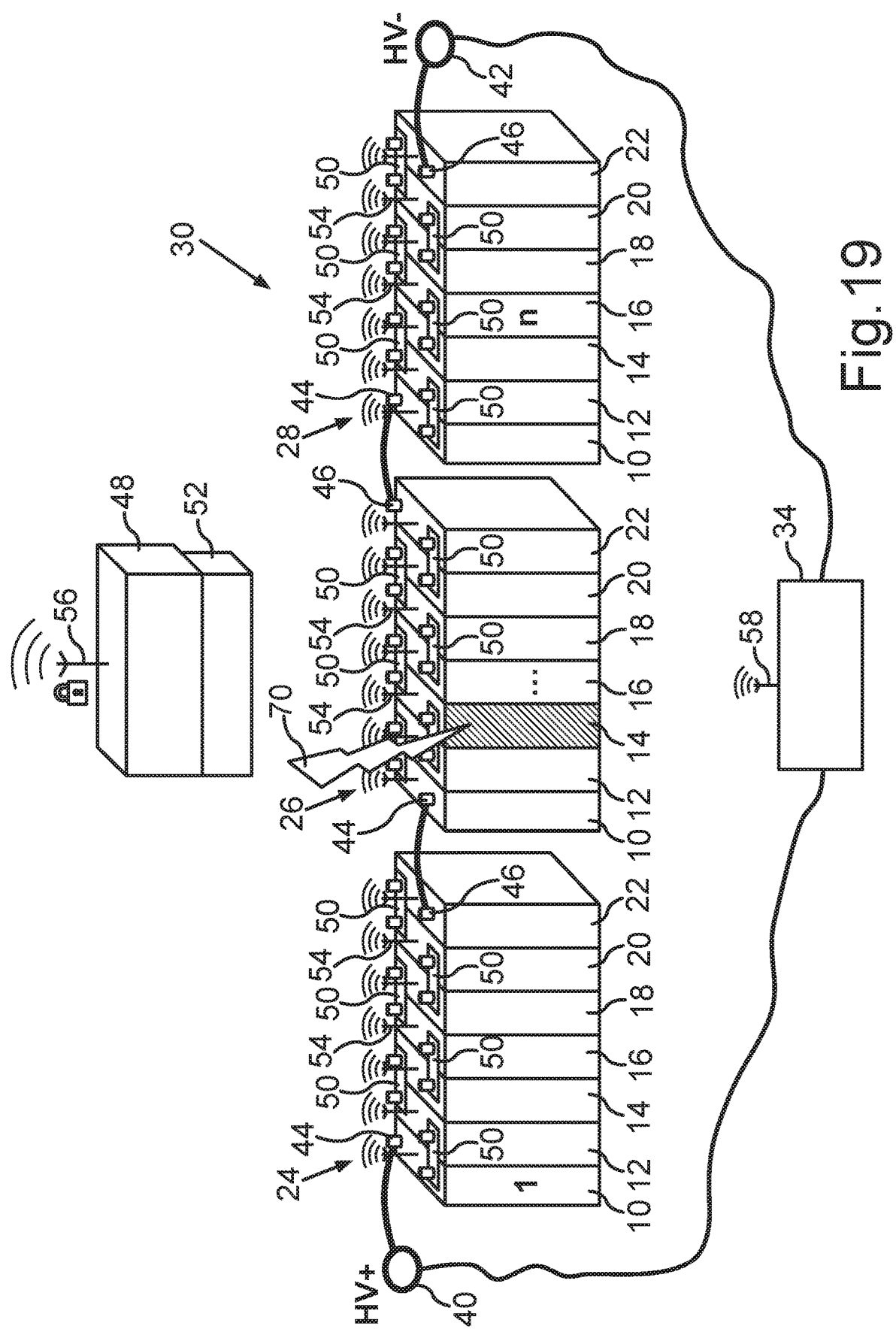

DISCHARGING A BATTERY MODULE, HAVING AT LEAST TWO BATTERY CELLS, OF A BATTERY HAVING AT LEAST TWO BATTERY MODULES

FIELD

The present disclosure relates to a method for discharging of a battery module, having at least two battery cells, of a battery having at least two battery modules, wherein the battery cells of each of the battery modules are arranged next to one another and are mechanically and electrically connected to one another, wherein, in each of the battery modules, the respective battery cells are individually activated by a cell switch unit in a first switching state of the cell switch unit and deactivated by a cell switch unit in a second switching state of the cell switch unit. The invention further relates to a discharge device for discharging of a battery module, having at least two battery cells, of a battery having at least two battery modules, wherein the battery cells of each of the battery modules are arranged next to one another and mechanically and electrically connected to one another, having an electrical energy-consuming unit for converting supplied electrical energy into heat. Furthermore, the disclosure includes a battery with two battery terminals and at least two battery modules, wherein each of the battery modules has two module terminals, by which the battery modules are electrically connected to one another and are connected to the battery terminals, wherein each of the battery modules has at least two battery cells arranged adjacent to one another, which are mechanically and electrically connected to one another and are connected to the respective module terminals, wherein each of the battery modules comprises a cell switch unit, controllable by a control unit, for individually activating the respective battery cells in a first switching state and for individually deactivating the respective battery cells in a second switching state. Finally, the disclosure also includes a motor vehicle having an electrical drive unit for driving the motor vehicle as well as a battery, which is connected to the electrical drive unit.

BACKGROUND

Methods for discharging battery modules, discharge devices, as well as batteries and motor vehicles of the common type are extensively known in the prior art. In addition to stationary applications such as, for example, with uninterrupted energy supplies, electrical energy supplies in isolated operation, and/or the like, batteries of the common type are also used with motor vehicles, and specifically with electrically drivable motor vehicles such as, for example, electric vehicles, hybrid vehicles, or the like.

A battery of the common type is used to reversibly store electrical energy. Such a battery is also characterized as an accumulator battery. For the purposes of the reversible energy storage, the battery normally comprises multiple battery cells, which are formed as galvanic cells and enable the storage chemically of electrical energy. To this end, a battery cell normally has two electrodes, which are connected to one another electrochemically, for example by means of an electrolyte that interacts with the electrodes. An electrical DC voltage, which essentially results due to the electrochemistry, then is produced at the electrodes. The DC voltage, which is established between the electrodes of an individual battery cell, is typically a few volts, for example about 1.2 V to 4.5 V, depending on the cell chemistry.

Batteries of the common type are frequently intended, however, to provide high DC voltages, for example a DC voltage in a range of several 100 V, for example about 400 V or more, particularly about 800 V, with electrically drivable motor vehicles. This means that, in order to implement such DC voltages from a battery, a plurality of battery cells must be switched electrically in series. Depending on the energy consumption or performance needs, a parallel connection of battery cells may also be required as a supplement.

This results in special requirements, particularly from a design perspective and from the perspective of electrical safety, which are to be noted with such batteries, also known as high-voltage batteries. Due to these requirements, it is nowadays customary to design the battery in a type of modular construction. To this end, it is customary to combine a plurality of galvanic cells mechanically and electrically to form a battery module such that an individually manageable modular unit is provided. The battery module can be tested with respect to its properties, particularly with respect to its electrical properties, as an independent assembly. The battery is then made up of a corresponding plurality of such battery modules combined, for example in that the battery modules are mechanically and/or electrically connected to one another in the specified manner, preferably to form a modular unit, for example in that they are correspondingly arranged in a battery housing of the battery. The battery modules may also have their own housing, in which the battery cells are arranged. The housings, however, may only consist of a frame, which affixes the respective battery modules with respect to the battery or that affixes the respective battery cells with respect to the battery module.

To this end, the battery module normally comprises two module terminals, which are electrically connected to the battery cells on the battery module side. The module terminals are, in turn, connected to battery terminals within the battery such that the desired DC voltage of the battery can be provided to the battery terminals. Consequently, the DC voltage at the battery terminals is normally greater than the DC voltage at the module terminals, which, in turn, is normally greater than the DC voltage which is provided at the electrodes of the respective individual battery cells. If there is a pure parallel connection of the battery cells within a battery module or the battery modules within the battery, the corresponding DC voltages are commensurate.

An exemplary design for a battery module specifies that 12 battery cells are arranged in a mechanical housing and electrically connected to one another in series and/or in parallel by means of busbars. Preferably, the battery cells are arranged electrically with respect to one another in isolation. Moreover, they may be cooled by means of a cooling device. Such battery modules are suitable to be used as standardized components such that practically any batteries can be realized and that a corresponding number of battery modules are provided collectively in the battery.

Even though this design is proven in the prior art, there are still disadvantages. Due to progressive development, the energy density and/or the power density of the individual battery cells continues to increase. Among other things, the cell chemistry being used can therefore also be more aggressive. This results in the danger that dangerous states such as, for example, those caused by a short-circuit within the cell, are significantly enhanced in the event of failure and the safety, particularly the electrical safety and fire protection, may be negatively impacted. This requires additional complexity, which typically results in corresponding costs and complex technical measures. Moreover, there is the problem that battery cell technologies sometimes reach the market prematurely due to short development time specifications. If such battery cells are processed into battery modules and then further into corresponding batteries, the corresponding aforementioned risks increase exponentially.

A further problem occurs with respect to quick-charging the battery when it takes place, for example, at a power level of about 150 to 300 kW in order to recharge all battery cells. The supply of energy takes place in a comparatively short timeframe, which may be less than 30 minutes. This can cause all of the battery cells to be exposed to a high stress level, which may result in extensive aging and extensive release of heat.

Moreover, there is also of course the danger with respect to battery cells that there may be very strong reactions in and around the respective battery cell with a failure of any type, because the energy stored in the battery cell can be released in a short frame of time. This problem may occur, for example, with a thermal runaway, with internal and/or external short-circuits of the battery cells, with micro-short-circuits, with foreign particles, with non-homogeneities, with aging effects, with plating, with mechanical deformations, with an accident, with leaks, particularly due to the diffusion of moisture into the battery cells, and so forth.

With respect to this, DE 10 2013 204 539 A1 discloses a battery cell having a soft-short safety function and a method for monitoring a battery cell. This teaching only considers an individual battery cell of a traction battery. Neighboring cells, which may also be impacted, are not considered by this teaching. Moreover, DE 2013 206 191 A1 discloses a discharging of a battery cell due to short-circuiting by means of a bimetal. The bimetal is thermally coupled to the battery cell. If a predefined temperature is achieved by the battery cell in the area of the bimetal, it opens a contact upon which the battery cell is switched off by means of the bimetal switching contact.

Furthermore, DE 10 2014 205 116 A1 discloses a battery cell device having a battery cell and a current-limiting circuit as well as a method for limiting a current flowing over the battery cell and the battery cell connections of the battery cell, and EP 2 355 229 A1 discloses a high-current battery system and a method for the control thereof.

In the event of a failure, as previously explained by means of examples, the following sequence may result with respect to a battery:

Initially, the electrical energy stored in the battery cell leads to extensive heat development in the event of a failure. Said heat development initially occurs locally limited within the battery cell. The failure may be caused, for example, by an internal micro-short-circuit, penetration of a foreign body, an accident, penetration of a separator, by dendrite formation, and/or the like. In this process, very large quantities of energy can be released in a very small space, whereby a great increase in temperature can result. This is due, inter alia, to a correspondingly high current density in the area of the point of failure. Consequently, the pressure within the battery cell may also increase if a battery cell housing does not provide any corresponding possibility of relief. If a correspondingly high temperature is achieved, for example more than 150° C., this may lead to a chemical avalanche effect. Consequently, this may result in release of the chemically stored energy in the form of an exothermic reaction, which may result particularly in a fire. Simultaneously, a further pressure increase may occur within the closed battery cell provided it was not already impaired. When a pressure threshold value is exceeded, this may result in a sudden bursting of the battery cell housing and/or to outgassing of the contents in the battery cell to the environment. In doing so, ignitable or even already burning mixtures can be released.

The previously described scenario may lead to propagation effects, with a battery in which a plurality of battery cells are arranged together in the tightest of spaces, which may lead to a plurality of additional battery cells being incorporated into the scenario. In the worst-case scenario, the entire battery can burn. In this process, the events in the affected battery cell in the previous scenario negatively impact spatially adjacent battery cells in a type of chain reaction, wherein these battery cells also negatively affected can likewise be induced into corresponding reactions.

Moreover, in such a scenario with parallel-connected battery cells, the case may be that additional electrical energy from nonaffected battery cells is transferred to the faulty battery cell such that the failure scenario is further reinforced there. Thus, with four parallel-connected battery cells for example, when a fault starts to occur in one of the battery cells, the three other battery cells feed additional energy into the faulty battery cell, for example when an internal short-circuit has occurred in the faulty battery cell. In the event of a short-circuit, large short-circuit currents may occur, for example in a range from about 3 to 5 kA, in an individual battery cell, particularly as a function of the cell type of the respective battery cell. In the previously described case of the parallel connection, further corresponding short-circuit currents may occur, in addition to the short-circuit current that can be provided by the faulty battery cell, such that, with the aforementioned example, a short-circuit current in the area of the point of failure of, for example, about 12 to 15 kA, can occur. The point of failure in this case only needs to be as large as a pin head or even smaller.

SUMMARY

The object of the invention is to improve the safety with batteries as well as battery modules.

To achieve this object, the invention proposes a method, a discharge device, a battery, as well as a motor vehicle according to the independent claims.

As regards the method, it is particularly proposed for a common method that the battery cells of the battery module to be discharged one after the other are selectively electrically coupled successively to a discharge device by means of the cell switch unit, starting from one predefined battery cell, in order to individually successively electrically discharge the battery cells in order to discharge the battery module.

With respect to a common discharge device, it is particularly proposed that the electrical energy-consuming unit is formed precisely to discharge one of the battery cells of the battery module to be discharged of the battery.

With respect to a common battery, it is particularly proposed that the control unit is formed to selectively electrically couple successively to a discharge device by means of the cell switch unit, in order to discharge one of the battery cells of the battery modules, starting from one predefined battery cell, in order to individually electrically discharge successively the battery cells in order to discharge the battery module.

As regards the motor vehicle, it is particularly proposed for a common motor vehicle that the battery is formed according to the invention.

The invention is based on the knowledge that a battery, as previously stated, which forms a highly complex assembly, monitors whether failures occur at the respective battery cells of the battery modules by means of a monitoring system. If a corresponding failure state is determined, an orderly discharging of the affected battery module can be immediately initiated such that no or only a slight amount of energy is available for continuing the failure state to the extent possible. Preferably, the battery module is completely discharged such that a hazardous state for the battery as a whole can essentially be prevented, that is, inter alia, also for other battery modules and other battery cells. Thus, propagation effects can be reduced or even eliminated with the invention. So that this can be achieved, the invention proposes an orderly removal of the electrical energy stored in the battery module.

In doing so, the invention provides that each of the battery modules has a cell switch unit, controllable by means of a control unit, which is used for individual activation of the respective battery cells in a first switching state and for individual deactivation of the respective battery cells in a second switching state. Thus, with each of the battery modules, each individual battery cell can be activated or deactivated as needed. In doing so, activation of the battery cell means that it is actively coupled into an electrical circuit of the battery cells within the battery modules such that it enables the provision of the desired energy storage function in proper operation. With parallel-connected battery cells, this can be achieved in that the cell switch unit has its own switching element for each of the battery cells, which is switched in series to the respective battery cell. If the switching element is in the open state, the battery cell is deactivated, while the battery cell is activated when the switching element is in the closed state. On the other hand, if there is a pure series connection, a bypass circuit may additionally be provided for each of the battery cells such that the respective battery cell is electrically disconnected from the other battery cells by means of a first switching element and simultaneously a bypass circuit, which electrically connects the remaining battery cells to one another, is activated by means of a second switching element. Overall operation of the battery module can thereby be maintained. However, the bypass circuit in this case is also advantageous for the invention, because namely the other battery cells switched in series can be deactivated, and the affected faulty battery cell can be selectively discharged by means of a series connection of the respective bypass circuits of the other battery cells via module terminals of the battery module, as is indicated further in the following.

The invention enables an orderly discharging of the battery module, which is also optimized for safety such that endangerment of further battery modules or even the battery as a whole can be prevented to a great extent. A discharged battery module can be replaced subsequently during maintenance or the like such that the battery can again achieve its completely functional state.

The invention can be advantageously combined with the discharge device as a type of monitoring device, by means of which an intelligent early detection system as a type of Smart Safety Detection System (SSDS) can be achieved together with the discharge device of the invention, which may be formed as a Smart Power Dissipation Unit (SPDU). Preferably, the discharge device has a control unit, which has a communication connection with at least one of the cell switch units such that, for the purposes of discharging a cell of a battery module, a corresponding switching state can be established. Thus, the invention is based on the fact that battery cells of the battery module can be individually switched and optionally are equipped with a bypass function. A possible failure can thereby be detected very early with great probability such that hazardous states can be reduced or even avoided completely. In doing so, it should be noted that a discharging of all battery cells of the battery module at the same time can cause additional problems and stresses. Namely, a discharging of the cells leads to the battery module energy, which is stored in all of the battery cells, having to be dissipated simultaneously. A corresponding discharge device must therefore be formed of corresponding size. Moreover, it should be noted that additional losses can occur also when discharging a battery cell. This particularly proves to be disadvantageous when supplementary effects such as temperature increase, pressure increase, and/or the like can thereby affect the faulty battery cell. The failure state can thereby be further reinforced.

In reference to safety, this shows that, an orderly discharging of the battery module is essential, in addition to detection of a failure of a battery cell as early as possible.

The cell switch unit may be provided as a separate switching unit in the battery module. However, it may be provided that the cell switch unit is distributed to the respective battery cells, particularly corresponding portions of the cell switch unit are integrated into the respective battery cells. The cell switch unit may comprise switching elements in order to implement the desired switching function. The switching elements may be formed by means of electromechanical switching elements, such as contactor or relay contacts, but also by means of semiconductor switching elements such as transistors, particularly field-effect transistors, preferably Metal Oxide Field-Effect Transistors (MOSFET), Isolated Gate Bipolar Transistors (IGBT), but also by means of Gate Turn-Off thyristors (GTO), and/or the like. These switching elements are preferably likewise arranged integrated into the respective battery cells.

Moreover, the control unit is provided, which is connected to the cell switch unit. To this end, the cell switch unit may have one or more communication interfaces, by means of which it communicates with the control unit. The communication interfaces may be formed, for example, to be wired or even wireless. A wireless embodiment may be based, for example, on radio, particularly near-field. Preferably, each of the battery cells has an independent communication interface, by means of which it communicates with the control unit. Preferably, the communication interface on the battery cell side is connected to a respectively integrated part of the cell switch unit. The activation or deactivation of a respective battery cell of the respective battery module can be controlled by means of the control unit.

The control unit itself can be provided as a separate modular unit. However, it is preferably a component of the battery. In particular, it may also of course be a component of the battery modules, wherein, for example, each battery module may have an independent control unit. These independent control units of the battery modules can, in turn, communicate with one another. Moreover, a prioritized control unit may be provided.

It has proven to be especially advantageous when the battery cells have cell sensors, which are formed to detect at least one respective cell state of the respective battery cell. If the battery cells are communicating with the control unit in communication technology terms, the respectively detected state value can be transmitted to the control unit for further processing. A monitoring of the respective battery cells can hereby be achieved in that the control unit monitors the respective detected cell state.

Such battery modules, also called smart safety modules, can be connected to form a battery. The battery cells, which have both a cell switch unit integrated in portions as well as at least one cell sensor and which can be put into communication with the control unit, are also called smart cells.

The battery cells of a battery module are arranged adjacent to one another and are mechanically and electrically connected to one another. Preferably, a modular unit of the battery module is formed hereby. A battery module housing or frame may be provided for this.

In an advantageous further embodiment, it is proposed that at least the battery cells of the battery module, to be discharged, of the battery are deactivated before a start of discharging by means of the cell switch unit. This means that the energy storage function of the battery module to be discharged is deactivated as a whole such that a reinforcement of any failure state of a respective one of the battery cells of the battery module can be extensively prevented by supplying electrical energy externally. Moreover, it can be assured that electrical energy from the other battery cells of the battery module is not supplied to the predefined battery cells in order to reinforce, for example, a failure state of said battery cell. To this end, it may be provided that preferably all of the battery cells are deactivated by means of the cell switch unit. This function may be limited to the battery module to be discharged. However, it may also be provided that further battery modules of the battery are incorporated into this function, particularly those battery modules that are arranged directly adjacent to the battery module to be discharged. In this manner, the safety of the battery and of the battery modules can be further improved.

According to a further embodiment, it is proposed that, for the battery cells of the battery module, a respective state value is detected for a cell state; it is determined for the detected state values whether they are within a predefined value range, and a battery cell, the detected state value of which is outside of the value range, is determined as the predefined battery cell. Said embodiment considers that the battery cells of the battery module can be monitored with respect to at least one cell state. To this end, it may be provided that the battery module, particularly each of the battery cells of the battery module, has one or more sensor units, which are used to detect at least one cell state. The detected state values can be transmitted to the control unit, particularly when the control unit is a control unit based on a battery module. The control unit can take on the testing function and determine for the detected state values as to whether they are in a predefined value range. If at least one of the state values falls outside of the predefined value range, the control unit can determine and define the battery cell, the detected state value of which is outside of the value range, as the predefined battery cell. The discharging can be started then with this battery cell. This has the advantage that the battery cell, with which a faulty or impaired state is present, is discharged first in order to keep the effects of the faulty state of this battery cell or of the impaired state of this battery cell as small as possible. Thus, the safety as a whole can be further increased by virtue of the fact that this battery cell is discharged first.

If the state values of two or more of the battery cells of the battery module are outside of the value range, further criteria can be applied in order to determine the predefined battery cell which should be discharged first. For example, this may be the first of the battery cells occurring in the processing sequence. However, it may also be a battery cell, with which the state value is further outside of the value range, than the state value of the other battery cells of the battery module. Moreover, it may be provided that first a battery cell arranged spatially in the center to the extent possible is discharged in order to improve safety further.

A cell state may be, for example, a cell temperature, a cell pressure, a cell voltage, a cell current, an impulse with one of the aforementioned state values, a result of an impedance spectroscopy, and/or the like. In particular, the detected state values of a data analysis can be incorporated, preferably executed by the control unit. To this end, the control unit may comprise a corresponding data analysis device, which may comprise a hardware circuit, with said circuit comprising, for example, a computing unit. The computing unit may further comprise a storage unit, in which an executable computer program as well as data are stored. The computing unit can provide the desired analysis function by means of the computer program. In particular, this means that trends and/or prognoses of the cell states can be determined, particularly with consideration of a history of the cell states. This means that a potential consequence can preferably be detected early on, for example as a type of forecast. This enables time to be obtained for an early response such that a hazardous state of the battery or of one of its battery modules can be extensively prevented. In particular, the discharging according to the invention of the affected battery module can be introduced early on such that effects on the battery as a whole and its proper operation can be extensively reduced. Suitable application can, moreover, mean that the affected battery module is deactivated in terms of its energy storage function such that further operation of the battery can at least optionally be achieved with the remaining battery modules.

This means that the safety-relevant aspects can be significantly improved with respect to the battery and the battery modules.

If the control unit is a component of a battery module, it may comprise, for example, a cell module controller (CMC) as the computing unit. It may be arranged on a PC board, which is comprised of the battery module. Depending on the equipment, the CMC can be integrated directly into the battery module. However, it may also be arranged outside of the battery module at a suitable location. It may be advantageous in this case for the CMC to simultaneously have multiple battery modules to control. Preferably, the CMC monitors all battery cells of the battery module assigned to it or of the battery modules assigned to it. Moreover, it can control and even balance the battery cells. In addition, cell states within respective battery module can be detected in that the CMC module provides corresponding control commands to the respective sensor units of the battery modules or battery cells. The sensor units can then respond with corresponding state values. Evaluation and calculation of all information within the scope of data analysis can take place, for example, by means of a microcontroller, which is formed, for example, as a semiconductor chip and can be bonded directly to the PC board. The computing unit can be in communication with the battery cells as well as the cell switch unit and any sensor units by means of a BUS system such as, for example, a CAN-BUS and thereby retrieve all relevant data and/or transmit parameters and control commands. Moreover, the CMC can be in communication with a prioritized battery management system (BMS).

Abnormal patterns of behavior can also be determined from the data analysis, for which purpose a common analysis of the battery cells of at least one battery module can be incorporated. Intelligent algorithms, for example big data analysis algorithms, artificial intelligence (AI), adaptive systems, and/or the like can be used for this purpose.

Preferably, the discharging is started by determining the predefined battery cell. As previously explained, if a battery cell is determined, it can be assumed that it has an impaired state or a faulty state. The corresponding battery module should therefore preferably be deactivated immediately and discharged. If the determination of cell states is carried out continuously or repeatedly at specified times, an essentially permanent monitoring of the battery cells can thus be achieved. If a state value of a respective battery cell is detected as being outside of the value range, the discharging process according to the invention can thus be undertaken automatically. Thus, no further, particularly manual, interventions are necessary.

A further embodiment of the invention proposes that, with a battery module having more than two battery cells, a sequence of discharging of the battery cells is specified with consideration of a spatial distance from the battery cells to the predefined battery cell. This embodiment has proven to be especially advantageous if initially battery cells arranged spatially adjacent the predefined battery cell are protected from other battery cells. The location of a protentional fault source can thereby be deactivated, from an energy perspective, right at the start. Safety can be further increased hereby. This embodiment considers that the predefined battery cell is normally also an impaired battery cell, which is frequently thermally and mechanically especially stressed and usually impacts especially adjacent battery cells first. In order to reduce the propagation of a hazardous state, preferably the battery cells directly adjacent are therefore discharged next, after the predefined battery cell. The other battery cells of the battery module, which may still possibly be noncritical with respect to their safety state, are only discharged thereafter. The safety as a whole can thereby be even further improved.

Of course, the sequence of the discharging of the battery cells may additionally be specified depending on the detected state variable of the battery cells in reference to the predefined value range. This embodiment considers that a hazard potential of the respective battery cell can be evaluated by means of the detected state variable with reference to the predefined value range. Thus, after the predefined battery cell, first the battery cell which has the remaining largest hazard potential can be discharged According to a further embodiment, it is proposed that, when the discharge device is connected to battery terminals of the battery, the battery module to be discharged is selectively electrically coupled to the battery terminals by means of the cell switch unit of the battery modules. This means that the discharge device itself does not have to be selectively connected to the respective battery module. It is sufficient to connect the discharge device itself to the battery terminals in order to implement the discharging function according to the invention. This simplifies the assembly and connection complexity. In this case, of course the other battery modules, which are available in the battery in addition to the battery module to be discharged, should be deactivated accordingly such that, by means of the respective switching units of the battery modules, exclusively the battery module to be discharged is connected to the battery terminals. This ensures that exclusively this module is discharged. The other battery modules do not have to be detected by the discharging method of the invention. Nevertheless, it may of course be provided that, with the method according to the invention, also the other battery modules are discharged, particularly when it is desirable to transition the battery as a whole into the discharged state.

Preferably, the discharging of a respective battery cell of the battery module to be discharged takes place down to a predefined lower state of charge. The predefined lower state of charge is preferably selected such that the remaining energy content of the effective battery cell can no longer cause or support any hazardous state to the extent possible. Said embodiment considers that a complete discharging of the battery cell may frequently be impractical merely for reasons of time. Particularly when a complete discharging is to be achieved, discharge curves must be considered, according to which a discharging in the lower range of the state of charge may require more time correspondingly. Therefore, preferably the lower state of charge is selected such that the quickest discharging possible of the battery cell can be achieved. In doing so, a certain residual charge of the battery cell must be accepted.

According to the invention, the discharge device is formed such that the electrical energy-consuming unit is formed precisely to discharge one of the battery cells, of the battery module to be discharged, of the battery. This has the advantage that the discharge device can be very compact and lightweight such that it can be integrated, in a simple manner, into an electrical system, particularly into the battery or the respective battery module. Basically, the discharge device can be arranged at any suitable location, for example of the motor vehicle.

Preferably, the discharge device is a component of the battery. The discharge device may comprise the electrical energy-consuming unit as a type of electrical resistor, which is coupled to a suitable cooling surface, by means of which a corresponding heat output can be dissipated. Due to the fact that only one of the battery cells must be discharged, the discharge device can be formed in a very compact manner. If it had to discharge all of the battery cells of the battery module simultaneously, it would require a corresponding capacity and also a corresponding installation space and necessitate a corresponding weight. This is undesirable, particularly when used in motor vehicles. Therefore, the discharge device can be optimally adapted using the invention to execute the method according to the invention. Preferably, the discharge device (SPDU) may therefore comprise an independent switching unit or may also be connected to the cell switch unit of the battery module. Moreover, the discharge device may also be connected to battery terminals. It can be activated as needed by means of the switching unit. The discharge device is preferably in communication with the cell switch unit so that the desired selective discharging of one of the battery cells of the battery module can be achieved.

Preferably, it is provided that a battery cell to be discharged is discharged first and the subsequent battery cell is discharged after achievement of the discharged state or the predefined lower state of charge.

Moreover, an independent discharge device may be provided for each battery module. In order to distribute the heat developing during discharging as well as possible, corresponding cooling devices may be provided at a suitable site of the battery modules or even externally thereto. The cooling devices may be formed by heat sinks, which may be cooled by means of a coolant such as air, water, oil, or the like. The discharge device may further comprise an independent control unit, by means of which the discharging process is controllable. Preferably, the switching means or switching element assigned to it is controllable by means of the control unit. Moreover, the discharge device may have a communication interface, by means of which it can be placed in communication with the control unit of the battery module or of the battery. It is thereby possible to control the discharge device, from the control unit, correspondingly in a suitable manner such that the discharging process according to the invention can be executed.

Furthermore, it is proposed that the discharge device has a heat-dissipating surface, which is arranged on the battery and/or at least one of its battery modules. The heat can be thereby discharged at definable sites with the heat-dissipating surface. These sites can be selected such that the released thermal energy can be dissipated in a manner distributed as well as possible to keep from damaging other components thermally to the extent possible. Moreover, it may also naturally be provided that the heat-dissipating surface is used to implement a heating function, for example heating of the battery module or of the battery, in order to achieve a temperature of the battery cells, the battery module, and/or the battery as a whole that is beneficial for proper operation. This function is proven to be advantageous in winter, for example, in order to heat the battery or its components to an operating temperature. In addition, it may also be provided that the heat-dissipating surface is used as a smart power device, as a heating unit for the motor vehicle, for example as a type of PTC or the like, in order to implement preconditioning or even preheating.

The aforementioned effects and advantages in relation to the method of the invention and the discharge device obviously apply equally to the battery according to the invention and the motor vehicle equipped with the battery according to the invention. In this regard, reference is additionally made to the previous comments in this respect.

BRIEF DESCRIPTION OF THE DRAWINGS

Further advantages and features are listed in the following description of exemplary embodiments by means of the enclosed figures. The same reference numbers refer to equivalent features and functions in the figures.

The following is shown:

FIG. 19 a schematic view of the battery according to FIG. 1 with an impaired battery cell of a battery module;

DETAILED DESCRIPTION

Figure 1:
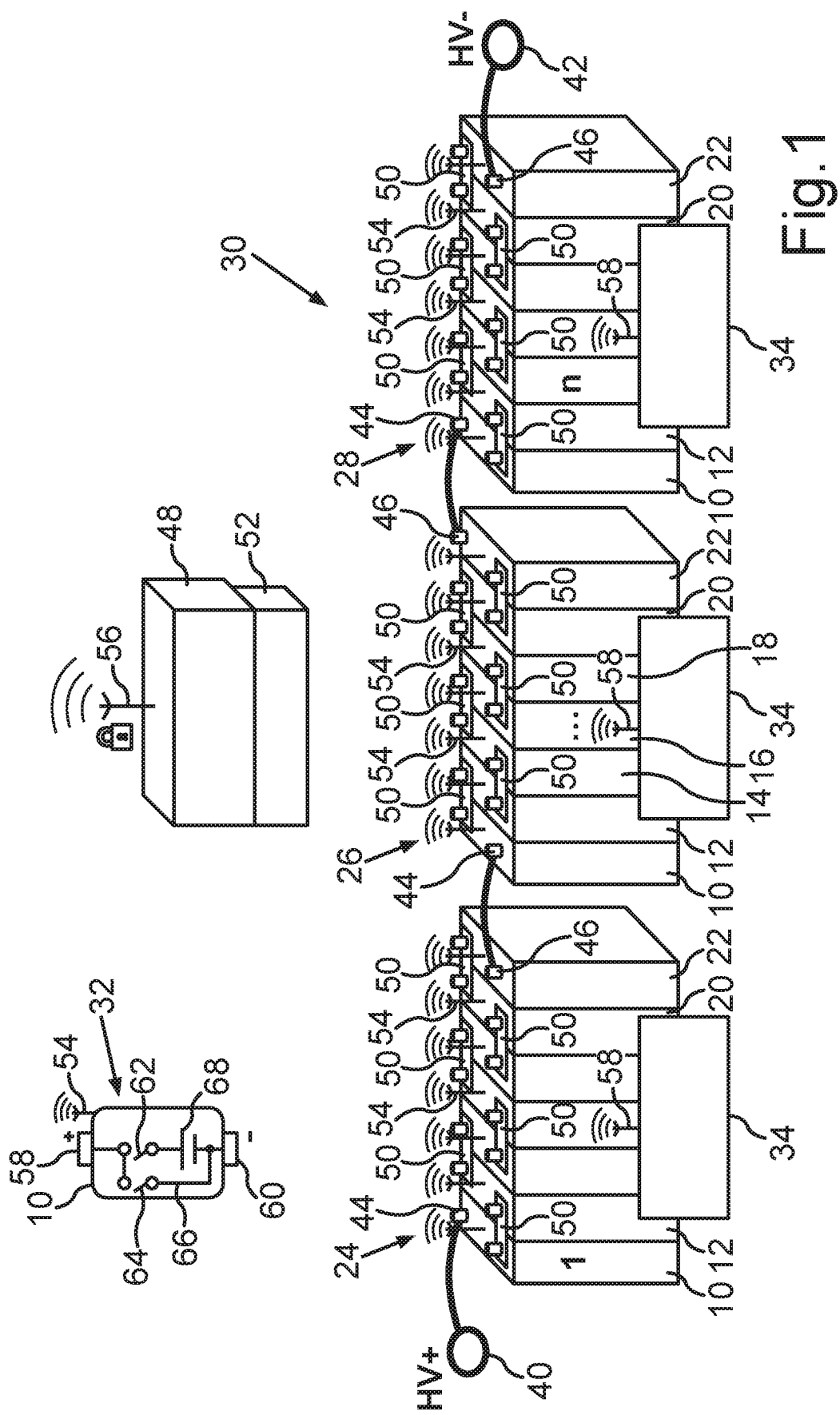
FIG. 1 a schematic block view of a battery with three battery modules, wherein each battery module comprises seven battery cells, having a control unit and a discharge device according to the invention.

FIG. 1 shows a schematic block view of a battery 30 having two battery terminals 40, 42, wherein battery terminal 40 provides HV+ potential and battery terminal 42 provides HV− potential. The battery 30 comprises three battery modules 24, 26, 28, wherein each of the battery modules 24, 26, 28 has two module terminals 44, 46. Module terminals 44 in this case provide a positive potential of the respective one of the battery modules 24, 26, 28, while module terminals 46 each provide a negative potential of the respective battery modules 24, 26, 28. The battery modules 24, 26, 28 are electrically connected to one another and to the battery terminals 40, 42 by means of the module terminals 44, 46.

Each of the battery modules 24, 26, 28 has at least two battery cells 10, 12, 14, 16, 18, 20, 22 arranged adjacent to one another, which are mechanically and electrically connected to one another and connected to the respective module terminals 44, 46. Corresponding busbars 50 are provided for this purpose.

The electrical connections between the battery modules 24, 26, 28 within the battery 30 are likewise carried out by power bridges, which are not shown.

The battery 30 further comprises a control unit 48, which is present as a Smart Cell Controller (SCC). It comprises a Smart Safety Detection System 52. This is used to analyze data, which is supplied to the control unit 48. In this case, it is provided that all of the battery cells 10 to 22 comprise a wireless communication interface 54. As an alternative or supplement, of course a wired, an optical, and/or even a Power Line Communication (PLC) may be provided. Accordingly, the control unit 48 also comprises a wireless communication interface 56. The communication interfaces 54, 56 here are designed for near-field. A protocol according to the WLAN standard serves as the communication protocol. All battery cells 10, 12, 14, 16, 18, 20, 22 thereby have a communication connection with the control unit 48.

In the upper left-hand area, one of the battery cells, namely battery cell 10, is schematically shown as a representative of battery cells 10 to 22. It is clear from this that battery cell 10 comprises battery cell connections 58, 60, wherein battery cell connection 60 is electrically connected to a negative electrode of a galvanic cell 68 of battery cell 10. The battery cell connection 58, on the other hand, is connected to a positive electrode of the galvanic cell 68 by means of a semiconductor switch 62, which is integrated into battery cell 10 and is part of a cell switch unit 32. Moreover, battery cell 10 comprises a bypass line 66, one end of which is connected to the battery cell connection 60 and the other end of which is connected to the positive battery cell connection 58 by means of a further semiconductor switch 64. By means of the semiconductor switch 64, it is possible to electrically connect the battery cell connections 58, 60 to one another as a type of bypass when the semiconductor switch 62 is open, that is the galvanic cell 68 is deactivated in terms of the energy storage function of the battery cell 10. In this case, battery cells 10 to 22 of battery modules 24, 26, 28 are all formed in this manner. Alternatively, the cell switch unit 32 may of course also be arranged external to the battery cell in the respective one of battery modules 24, 26, 28, for example in the form of a PC board comprising the switching elements 62, 64.

Furthermore, each battery cell of 10 to 22 comprises the communication interface 54, which is connected to an internal cell switch unit, which is not shown in more detail, with the cell switch unit being connected to sensor units, which are also not shown, with which cell states of the respective battery cells 10 to 22 can be detected. In this case, the cell states of temperature, pressure, electrical voltage of the galvanic cell 68, as well as the electric current are detected. These data are available by means of communication interface 54 and communication interface 56 of the control unit 48. Moreover, battery cell 10 to 22 receives control commands from the control unit 48 by means of communication interface 56 and communication interface 54 of battery cell 10 to 22, with said control commands being used to control the semiconductor switches 62, 64. Battery cells 10 to 22 are also characterized as smart cells.

It is further clear from FIG. 1 that each of the battery modules 24, 26, 28 comprises a discharge device 34. The discharge device 34 likewise has a communication interface 58, by means of which it can establish a communication connection to the control unit 48 via communication interface 58.

FIG. 19 shows an alternative embodiment to FIG. 1, in which the discharge device 34 is not provided in the form of modules for each of battery modules 24, 26, 28 but rather only as a battery in relation to the entire battery 30. In the present case, battery 30 according to FIG. 19 therefore only comprises one single discharge device 34, which is connected to the battery terminals 40, 42. On the merits, the function of the discharge device 34 according to FIG. 19, however, does not differ from the discharge device 34 according to FIG. 1, which is why reference is additionally made to the comments regarding this. At most, a difference results from an exposure to the electrical voltage at battery terminals 40, 42 during proper operation, for which the discharge device 34 must be designed in proper operation of the battery 30. However, the discharge device 34 according to FIG. 19 is deactivated in this operating state. In order to produce a corresponding voltage strength, an electromechanical switching element or even a correspondingly suitable semiconductor switching element may therefore be provided in the discharge device 34, said element providing electrical isolation when the discharge device 34 is not required during proper operation of the battery 30. The discharge device 34 is formed and correspondingly strained for the intended discharge operation of an individual battery cell 10 to 22 in this case as well.

FIG. 19 furthers schematically shows that a failure 70 has occurred at one of the battery cells 14 of the battery module 26. The failure 70 can be detected by means of sensors, which are not shown, based on state changes of the cell states of the battery cell 14. By means of the communication unit and the communication interface 54 of the battery cell 14, the corresponding data can be transmitted to the control unit 48, by means of the control unit communication interface 56. The control unit 48 processes the transmitted data of battery cell 14 and implements the procedure according to the invention, as it is further explained in the following by means of FIGS. 7 to 17.

Figure 18:
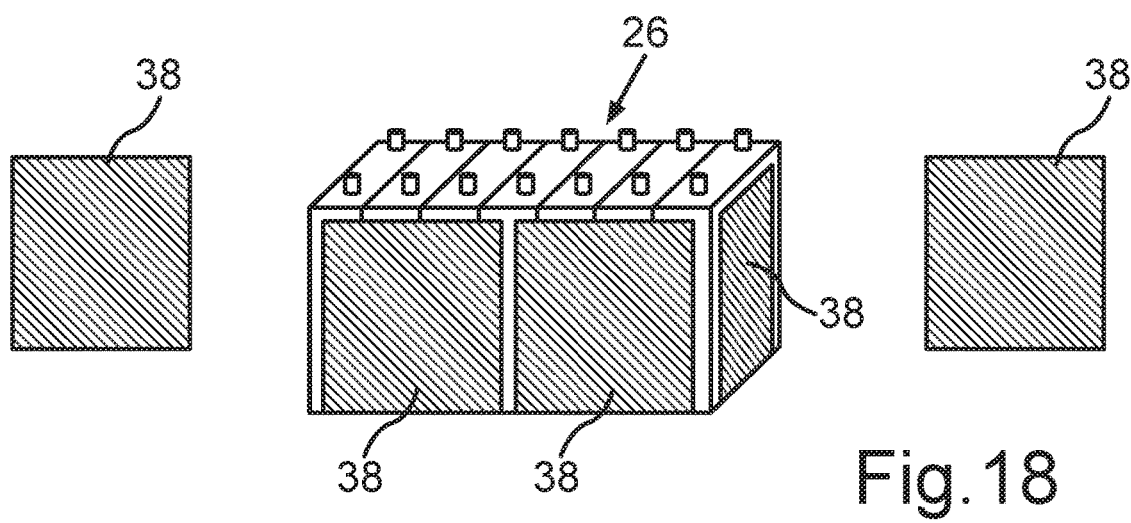
FIG. 18 a schematic view of a battery module according to FIG. 1 having differently arranged discharge devices.

FIG. 18 shows, in a schematic representation, one of the battery modules of battery 30, which is battery module 26 in this case. FIG. 18 clearly shows that the battery module 26 has cooling surfaces 38, which are thermally coupled to electrical resistors 36 of the discharge device 34. The electrical resistors 36 are shown in FIGS. 7 to 16 by the symbol of an electrical resistor in this case. The cooling surfaces 38 are arranged on the outer sides of a housing, which is not shown in greater detail, of the battery module 26. The electrical resistors 36 form electrical energy-consuming units. Electrical resistors 36 may be applied to the cooling surfaces 38 in this case by means of thick-film technology and/or the like. The cooling surfaces 38 themselves may be formed by means of a suitably formed metal plate, for example an aluminum plate and/or the like.

In addition to the arrangement of the cooling surfaces 38 on the battery module 26, additional cooling surfaces 38 with electrical resistors 36 may be arranged externally of the battery module 26, with a motor vehicle, for example, in an area not subject to airflow or the like. Good heat dissipation can thereby be achieved when discharging the battery module. In this case, it is provided that all of the battery modules 24, 26, 28 are equivalently formed with respect to this. Of course, in alternative embodiments, the battery modules may also deviate from one another.

Figure 2:
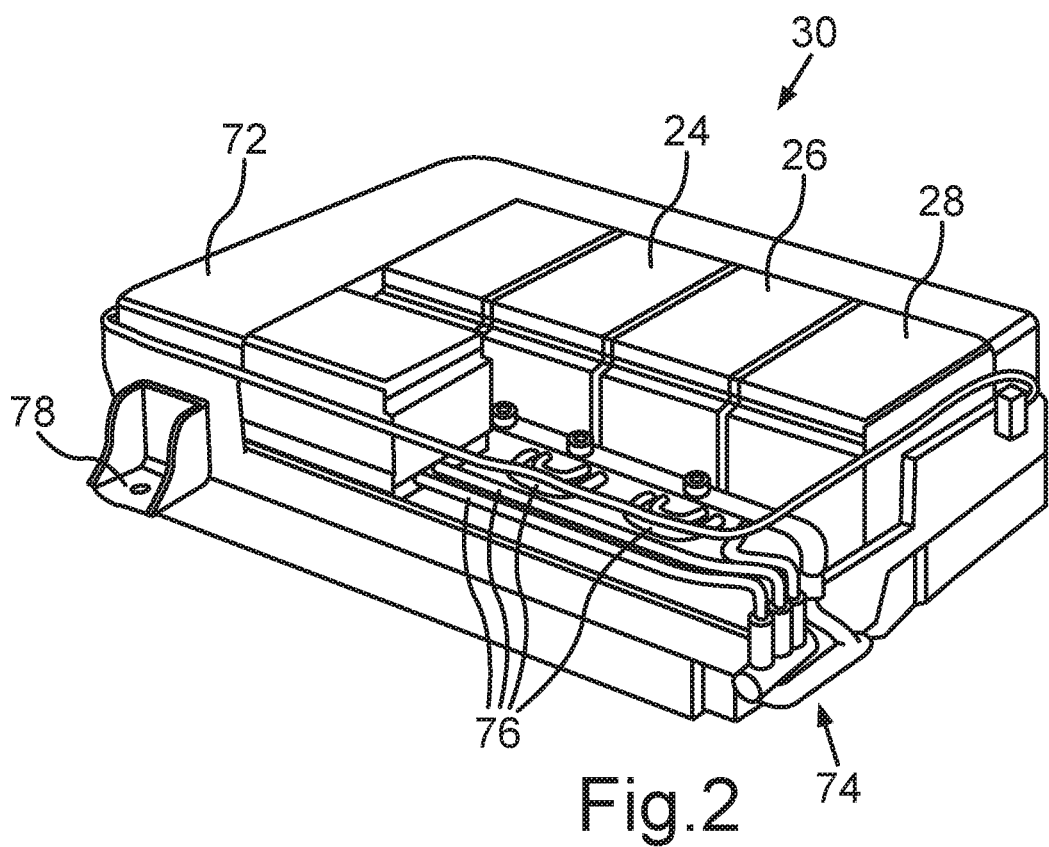
FIG. 2 a schematically perspective view of the battery according to FIG. 1.

FIG. 2 shows an embodiment of the battery 30 according to FIGS. 1, 19 in a schematically perspective view. FIG. 2 clearly shows that the battery 30 has a housing 72, which is made of aluminum cast in this case. The battery modules 24, 26, 28 as well as two other battery modules, which are not characterized here, are arranged in the housing 72. FIG. 2 further makes it clear that a cooling device 74, which comprises cooling lines 76, is integrated into the lower area of the housing 72. The cooling lines 76 are arranged underneath the battery modules 24, 26, 28. A coolant flows through them such that heat occurring in the battery modules 24, 26, 28 can be dissipated. In a heat exchange device, which is not shown in greater detail, the heat removed from the battery 30 with the coolant is further dissipated. A connection area for the battery 30 and the battery modules 24, 26, 28 is not shown in FIG. 2. The housing 82 of the battery 30 further has an attachment device 78, by means of which the battery 30 can be mechanically connected to a chassis of an electrically drivable motor vehicle. The motor vehicle itself is not shown in the figure. However, because the invention is not limited to use with electrically drivable motor vehicles, but can likewise be used with stationary energy storage devices, the connection device 78 may also be formed for other types of connection with stationary devices. Such devices may be, for example, an uninterrupted energy supply, particularly in signaling technology, [or] an energy supply in isolated operation, for example in building services. However, the invention may advantageously be used also for mobile applications such as, for example, with electrically drivable leaf blowers, bicycles, and/or the like, preferably anywhere in which battery systems can be used.

Figure 3:
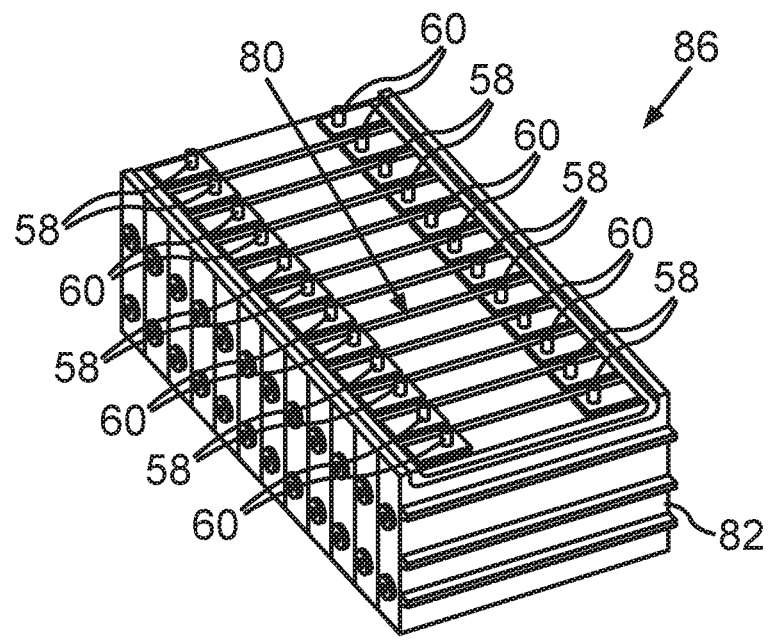
FIG. 3 a schematically perspective view of one of the battery modules of the battery according to FIG. 2 having twelve individual battery cells.
Figure 4:
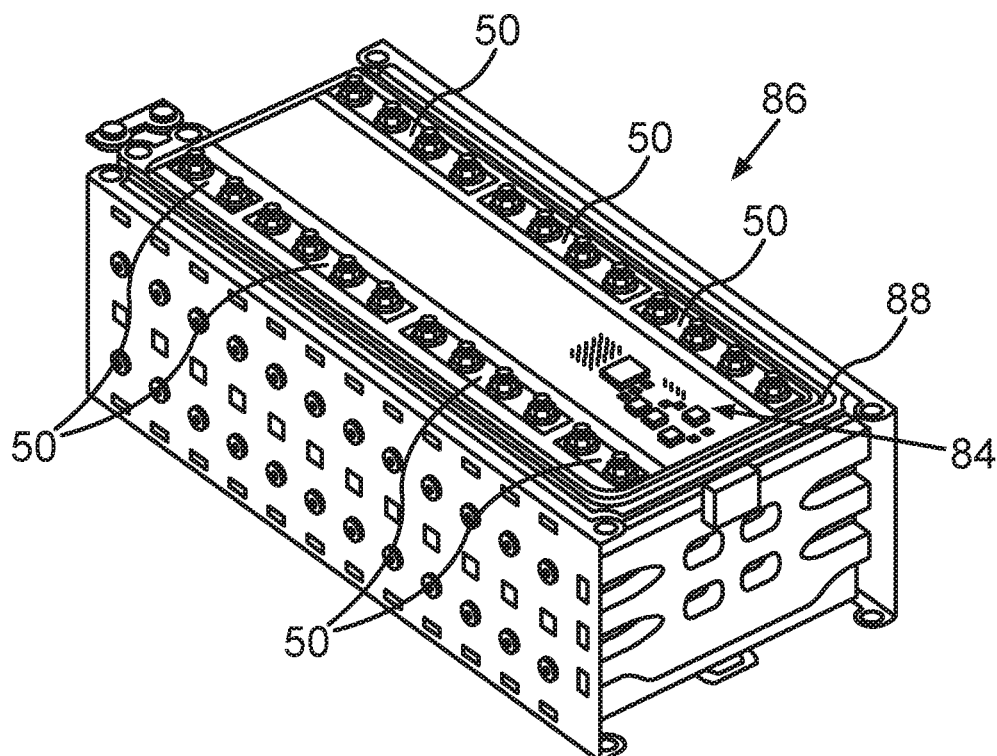
FIG. 4 a schematic view, as in FIG. 3, wherein, however, a cover with a PC board having a cell switch unit and a control unit is additionally provided.
Figure 5:
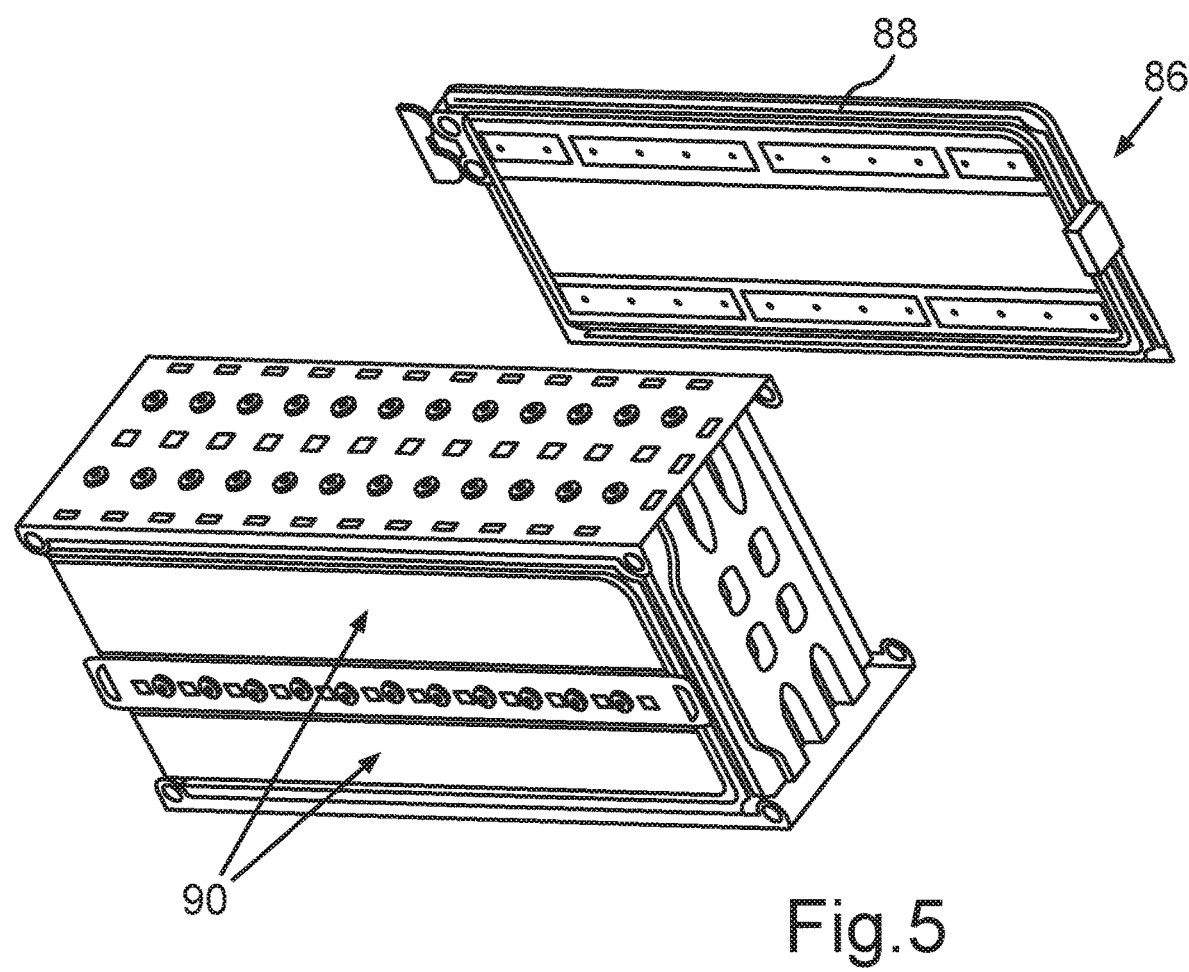
FIG. 5 a schematically a perspective view of the battery module according to FIG. 4, wherein a cooling device according to the invention is additionally provided.

FIG. 3 shows, in a schematically perspective view, battery module 86, which has twelve battery cells in this case, as an example of battery modules 24, 26, 28. For the sake of clarity, only seven of battery cells 10 to 22 are shown in FIGS. 1, 18, 19. However, the invention does not depend on the number of battery cells in a battery module. Battery cells 10 to 22 in this case are formed as prismatic battery cells and have a square shape. An insulating film 80 is arranged between adjacent battery cells 10 to 22. Battery cells 10 to 22 are accommodated and mechanically attached in a frame 82. The corresponding battery cell connections 58, 60 are arranged at an upper side 84 of battery cells 10 to 22. The battery module 86 from FIG. 3 itself is also square-shaped as a whole. FIG. 4 shows, in a schematically perspective view, the battery module 86 according to FIG. 3, wherein corresponding busbars 50 are then provided, by means of which the battery cells of the battery module 86 are electrically connected in the indicated manner. A PC board 84 with the control unit 48 as well as with the cell switch unit 32, which is not shown in greater detail here, by means of which cell states of the respective battery cells 10 to 22 are detected, on one hand, and cells 10 to 22 can be selectively activated or deactivated, on the other hand, is arranged between the busbars 50. The PC board 84 as well as the busbars 50 are integrated into a cover 88 (FIG. 5), which is only placed on the battery cell connections 58, 60 and attached thereto in a simple manner. The battery module 86 is covered with the cover 88. Cooling surfaces 90, which can enable contact of the cooling device 74 with the cooling lines 76 of the housing 72 of the battery 30 in order to dissipate heat from battery cells 10 to 22, are formed on the backside, opposite the cover 88. This is shown in a perspective view of the lower side of the battery module 86 in FIG. 5.

Figure 6:
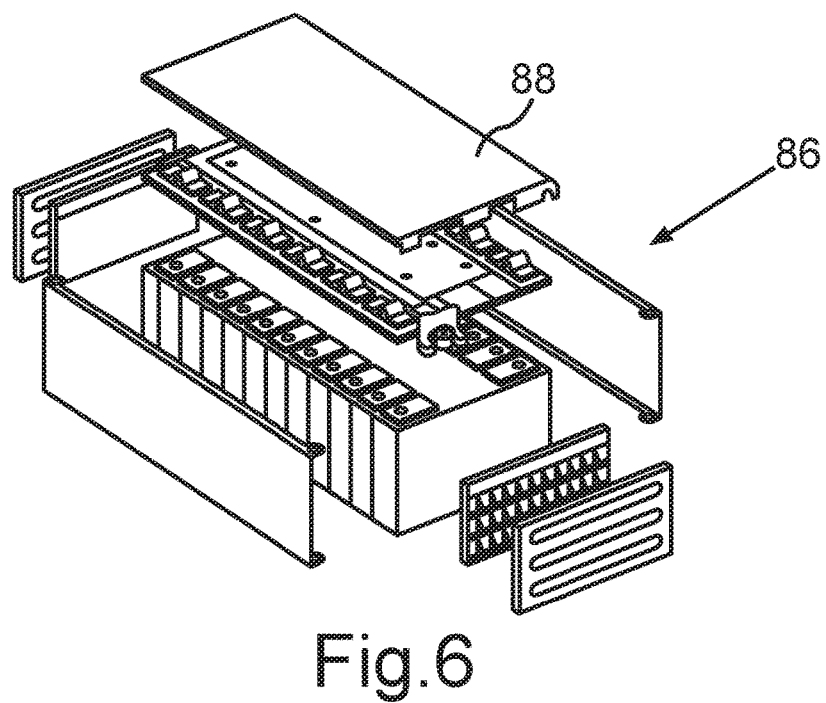
FIG. 6 a schematically perspective view of the module according to FIGS. 4 and 5 in an exploded view.

FIG. 6 shows, in a schematic exploded view, an alternative embodiment of the battery modules 86, also with twelve battery cells, wherein, in this case however, the cover 88 is constructed in a sandwich design.

FIGS. 7 to 12 are provided to explain the discharging method according to the invention according to a further exemplary embodiment. The discharging shall be explained by means of the battery module 26, as is shown in FIGS. 1, 18, and 19. Deviating from battery module 26 in FIGS. 1 and 19, battery module 26 from FIG. 7 only has six battery cells 10, 12, 14, 16, 18, 20 and not battery cell 22 in order to facilitate the representation and understanding. However, the method explained in the following essentially does not depend on the number of battery cells in a battery module. The method can therefore likewise be applied to battery module 26 of FIGS. 1, 18, and 19 with seven battery cells 10, 12, 14, 16, 18, 20, 22 as well as FIGS. 3 to 6 with twelve battery cells.

Figure 7:
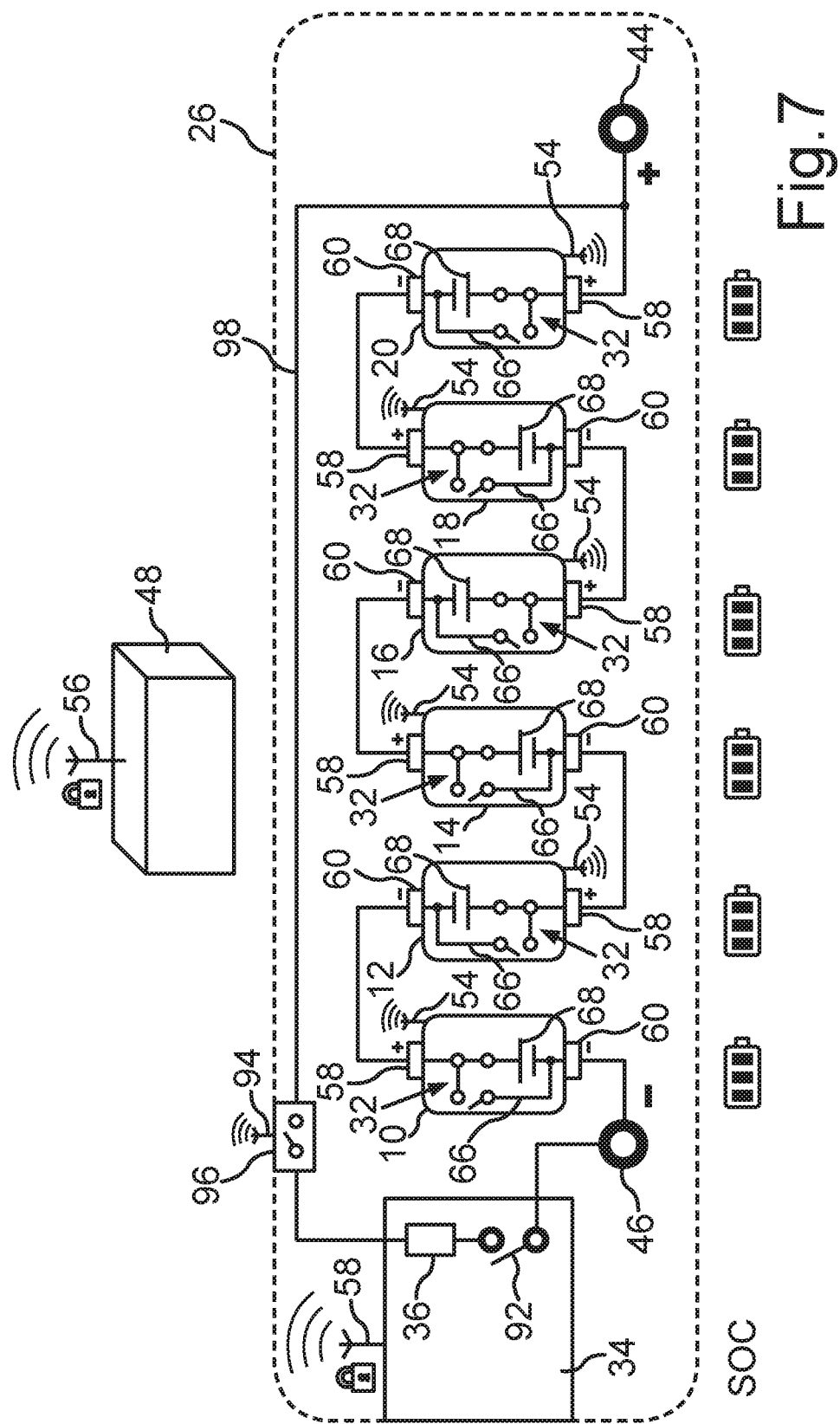
FIG. 7 a schematic block diagram of a battery module of the battery according to FIG. 1 during proper operation of the energy storage.

The battery cells 10, 12, 14, 16, 18, 20 of FIG. 7 correspond to battery cell 10, as has extensively already been explained and shown, in the upper left-hand area of FIG. 1. Reference is additionally made to these comments with respect to this.

In this case, battery module 26 has the six battery cells 10, 12, 14, 16, 18, 20, which are connected in series. To this end, the module terminal 46 is connected to the battery cell terminal 60 of battery cell 10. The battery cell connection 58 of battery cell 10 is connected to the battery cell connection 60 of battery cell 12. Furthermore, the battery cell connection 58 of battery cell 12 is connected to the battery cell terminal 60 of battery cell 14. Correspondingly, the other battery cells are connected, wherein the battery cell connection 58 of battery cell 20 is connected to the module terminal 44 of battery module 26. During proper operation, the galvanic cells 68 of the battery cells 10, 12, 14, 16, 18, 20 are connected in series such that DC voltage is provided, which corresponds to the total of the DC voltages provided by the galvanic cells 68, at module terminals 44, 46 by means of the cell switch unit 32 of the battery module 26, which is correspondingly partially integrated in this case into the respective battery cells 10, 12, 14, 16, 18, 20. States of charge of the respective battery cells are symbolically shown underneath the battery cells 10, 12, 14, 16, 18, 20. This is characterized as SOC (State Of Charge) in FIG. 7.

Furthermore, a discharge device 34 of the battery module 26 is connected to the module terminals 44, 46 by means of a controllable electromechanical switching element 96 and a line 98. The electromechanical switching element 96 is optional for the invention and does not necessarily have to be provided, because the switching function as such can also be implemented with a semiconductor switch 92 of the discharge device 34. The electromechanical switching element 96 makes it easier, however, to implement additional requirements, for example in reference to the electrical safety and/or the like. The switching element 96 has a communication interface 94, by means of which it can be controlled by the control unit 48 by means of the interface 56. Thus, the discharge device 34 can be activated by means of the switching element 96 for the purposes of discharging the battery module 26. The switching element 96 in this case is formed by a MOSFET. However, it may also be formed by another suitable component.

The discharge device 34 in this case comprises an electrical resistor 36, as has previously been explained. Said resistor is connected in series to the semiconductor switch 92, a MOSFET here as well, such that the respective discharging of one of the battery cells 10, 12, 14, 16, 18, 20 can be implemented by means of the semiconductor switch 92 with a likewise activated switching element 96. The discharge device 34 in this case is controlled by means of an independent control unit, which is not shown in the figures, such that the respective battery cell to be discharged is discharged down to a predefined lower state of charge. Once this state of charge is achieved, the discharging process is finished. To this end, it may be provided that the semiconductor switch 92 is connected in the open state.

In the operating state shown in FIG. 7, the battery module 26 can be operated during proper operation in terms of the energy storage function. The battery module 26 is activated.

Figure 8:
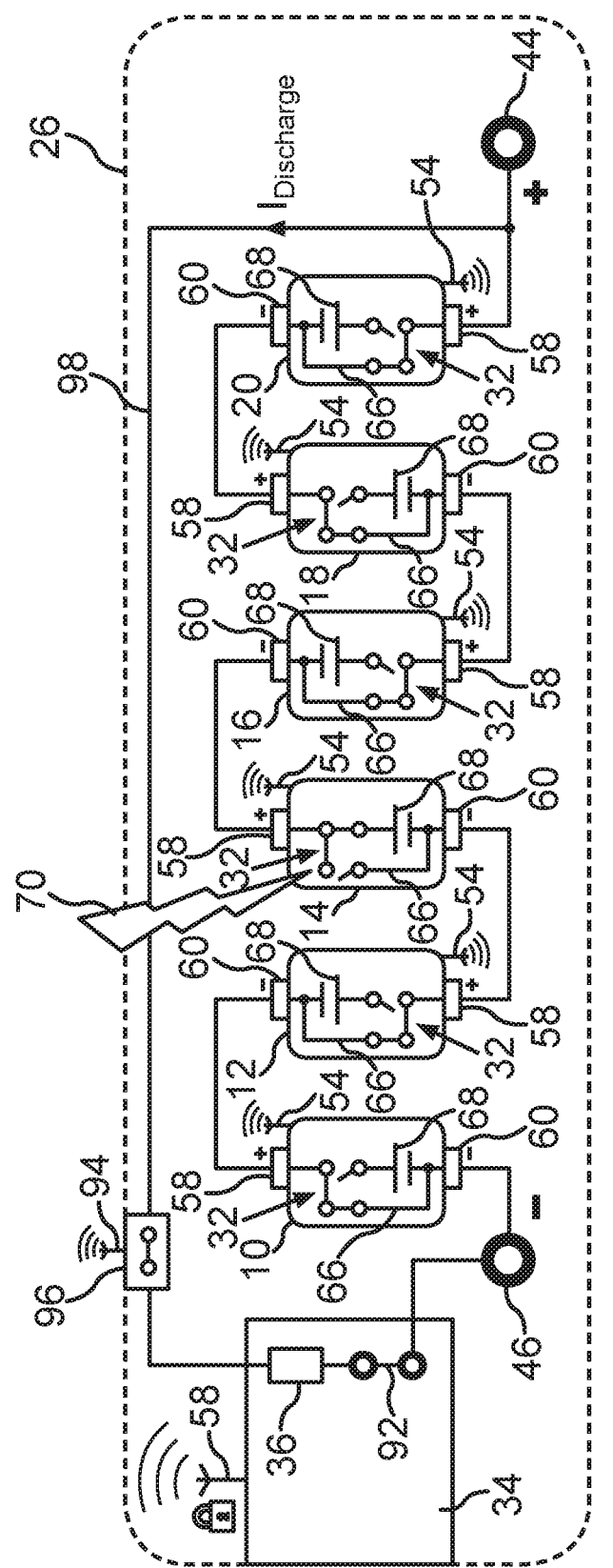
FIG. 8 a schematic view according to FIG. 7, wherein a failure has occurred at one of the battery cells.

FIG. 8 shows a representation as in FIG. 7, in which, however, a failure 70 has occurred in the battery cell 14. This failure 70 is detected by means of the sensors arranged in the battery cell 14 and transmitted to communication interface 56 of the control unit 48 by means of communication interface 54. The control unit 48 detects the failed state 70 of the battery cell 14 and transmits control commands for the switching unit 32 of the other battery cells 10, 12, 16, 18, 20. They switch off their respective galvanic cells by means of the semiconductor switches 62, which are switched to the open state. Simultaneously, these semiconductor switches 64 are closed such that the respective bypass line of the battery cells 10, 12, 16, 18, 20 is activated. This means that battery cell 14 with its battery cell connections 58, 60 then is positioned directly at the module terminals 44, 46 by means of the respective bypass lines 66.

The control unit 48 furthermore transmits a control command to close the switching element 96 by means of communication interface 56 and communication interface 94. The switching element 96 is closed in response. Thus, the discharge device 34 is activated for discharging to module terminals 44, 46 of the battery module 26.

Figure 9:
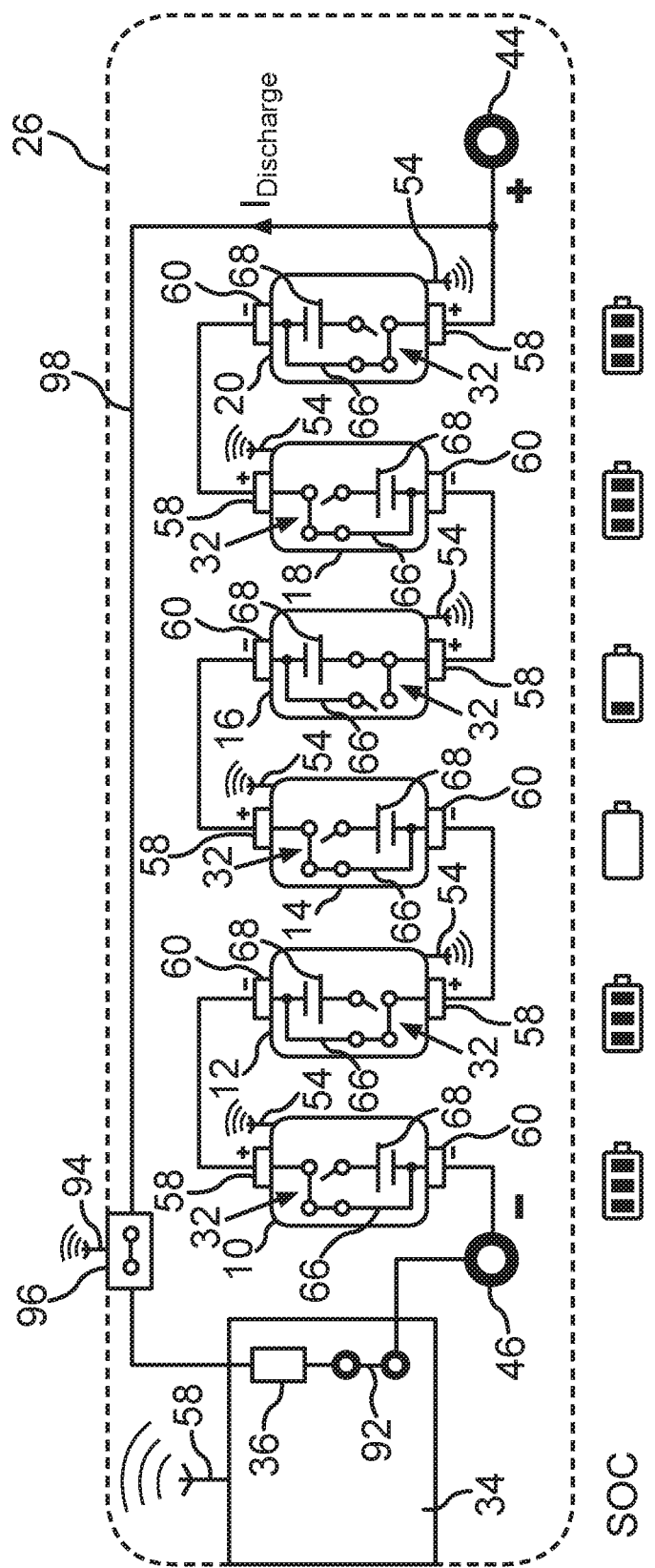
FIG. 9 a schematic view as in FIG. 7, wherein the impaired battery cell is detected as the predefined battery cell and connected electrically to a discharge device and discharged.

The control unit then transmits a discharge signal to the discharge device 34, upon which the semiconductor switch 92 is closed. The energy still existing in the battery cell 14 is thereby then removed and supplied to the electrical resistor 36, which converts the supplied electrical energy into heat. As previously explained, this heat is dissipated by means of the cooling surfaces 38 of the battery module 26. As soon as the battery cell 14 has reached the discharged state, semiconductor switch 62 of the battery cell 14 is opened and instead semiconductor switch 64 of battery cell 14 is closed. The bypass line 66 of the battery cell 14 is thereby activated (FIG. 9). Consequently, semiconductor switch 64 of the battery cell 16 is then opened and instead semiconductor switch 62 of battery cell 16 is closed. Battery cell 16 arranged directly adjacent is thereby then switched to module terminals 44, 46 such that battery cell 16 is discharged by means of the discharge device 34, as previously for battery cell 14. The discharging in this case takes place down to a predefined lower state of charge.

Figure 10:
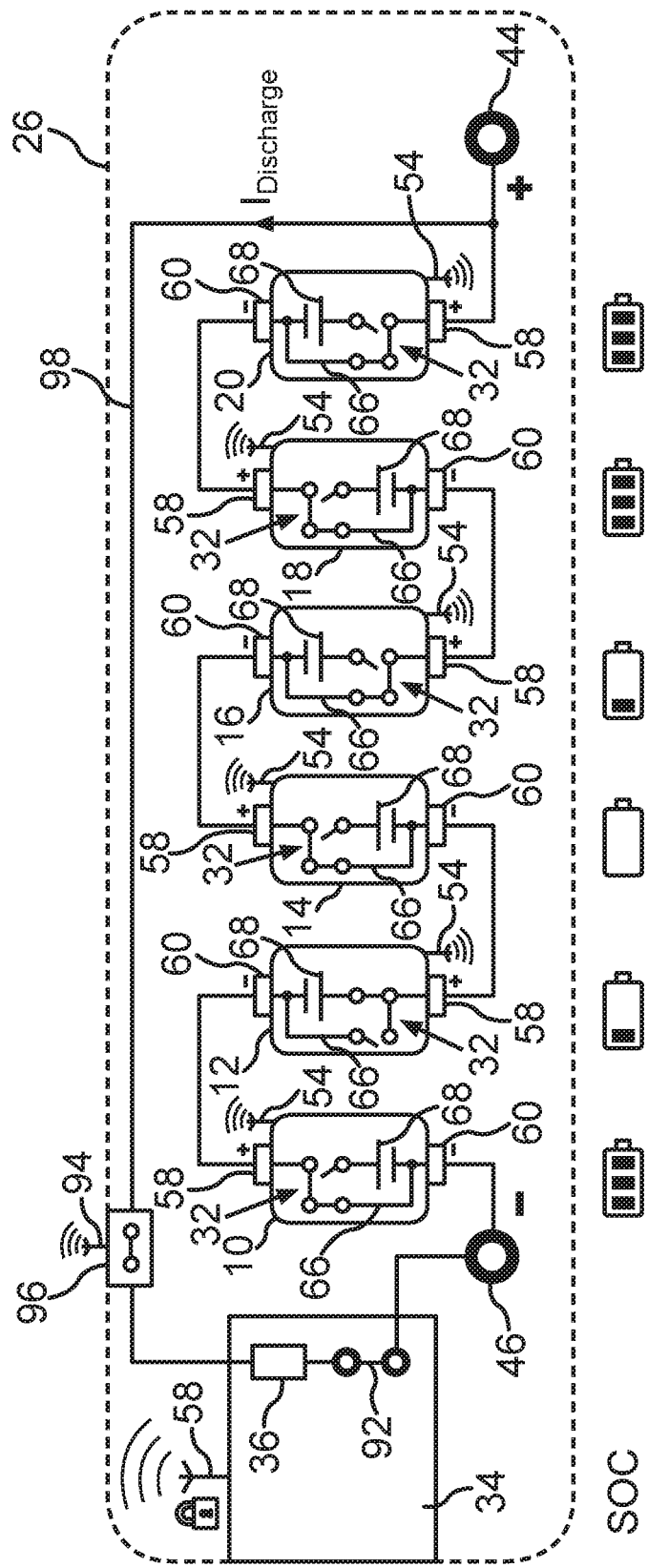
FIG. 10 a view as in FIG. 9, wherein a first adjacent cell is then discharged.

Once battery cell 16 is discharged, its semiconductor switch 62 is opened and instead semiconductor switch 64 is closed such that the bypass line 66 of battery cell 16 is activated. Moreover, with battery cell 12, semiconductor switch 64 is opened and semiconductor switch 62 is closed such that its galvanic cell 68 is then connected to the module terminals 44, 46. Battery cell 12 is thereby then discharged by means of the discharge device 34, as previously shown for battery cells 14 and 16 (FIG. 10).

Figure 11:
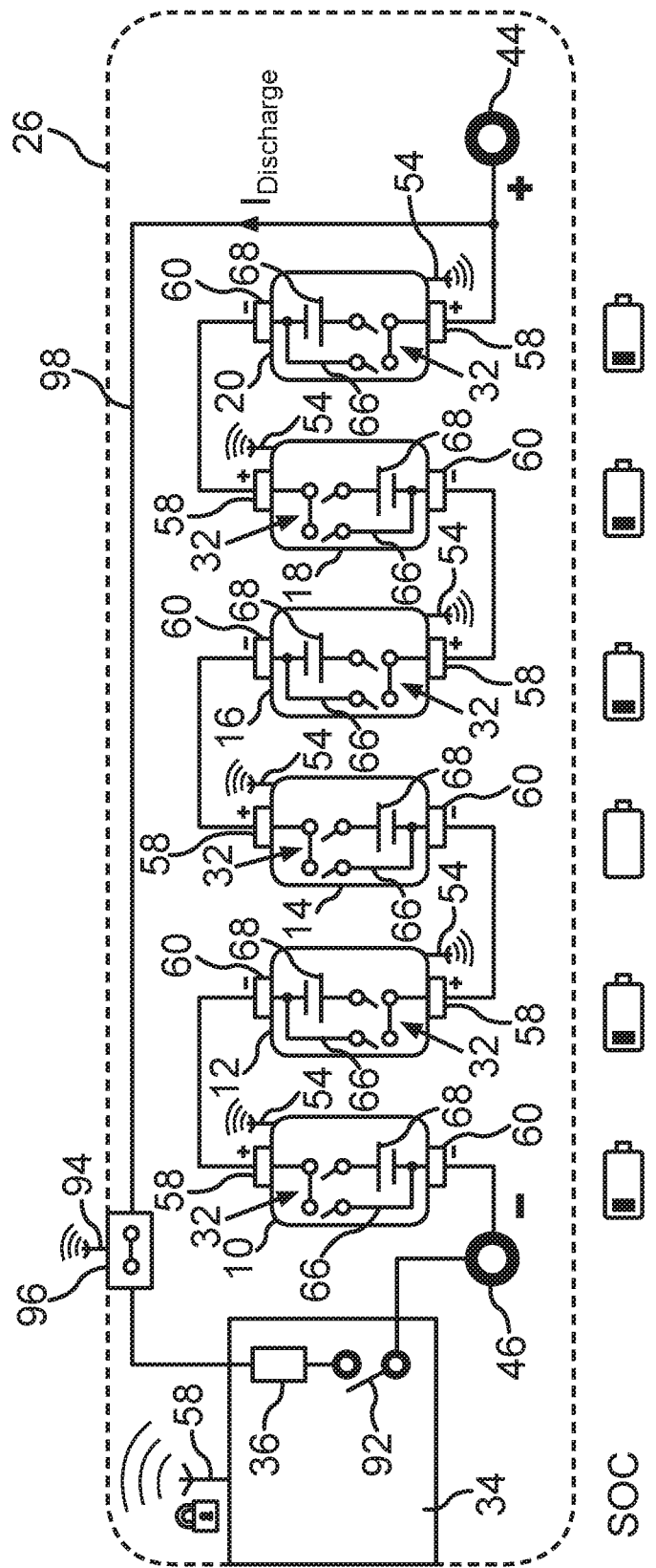
FIG. 11 a view as in FIG. 9, wherein the battery cells are then discharged and the battery module is deactivated.
Figure 12:
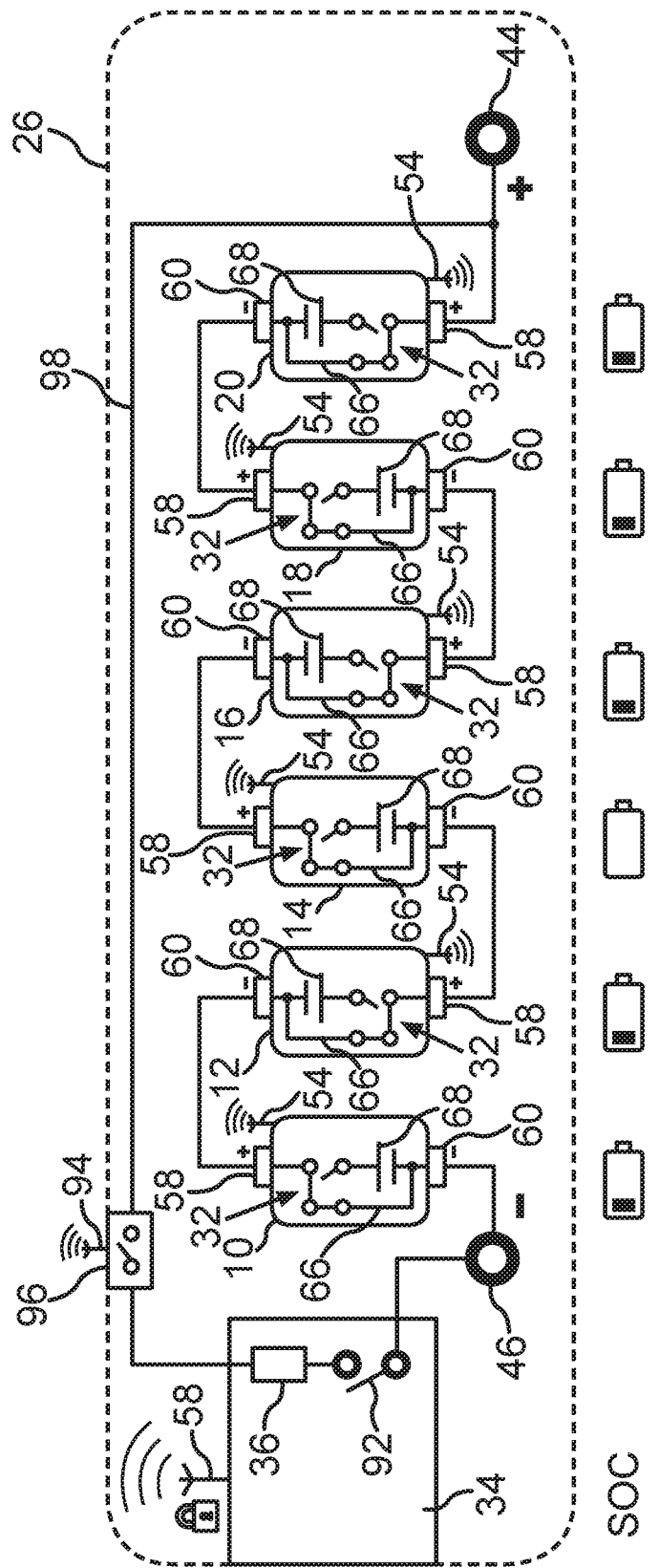
FIG. 12 a view as in FIG. 11, wherein the battery module is then discharged and all battery cells of the battery module are bridged by means of a respective bypass circuit.

According to the aforementioned diagram, the other remaining battery cells 10, 18, 20 are also discharged (FIG. 11). Once battery cells 10 to 20 are discharged, the semiconductor switch 92 of the discharge device 34 is opened. All semiconductor switches 62, 64 of battery cells 10 to 20 are likewise in the open state. Only the switching element 96 is still in the closed state (FIG. 11). By means of a last control command of the control unit 48, switching element 96 is then also switched to the closed state. Thus, the battery module 26 is discharged and also deactivated. Due to the fact that a failure in one of the battery cells 10, 12, 14, 16, 18, 20 could be detected early on, immediate sequential discharging then prevents a hazardous state from occurring for the battery module 26 and also consequently for the battery 30. The battery 30 can then be placed back into operation in that the battery module 26 with the defective battery cell 14 is replaced as a manageable modular unit. The battery 30 can thereby be maintained and/or repaired in a simple manner. Optionally, an emergency mode can also be implemented in that the bypass lines 66 of battery cells 10 to 20 are activated. This state is shown in FIG. 12.

Figure 13:
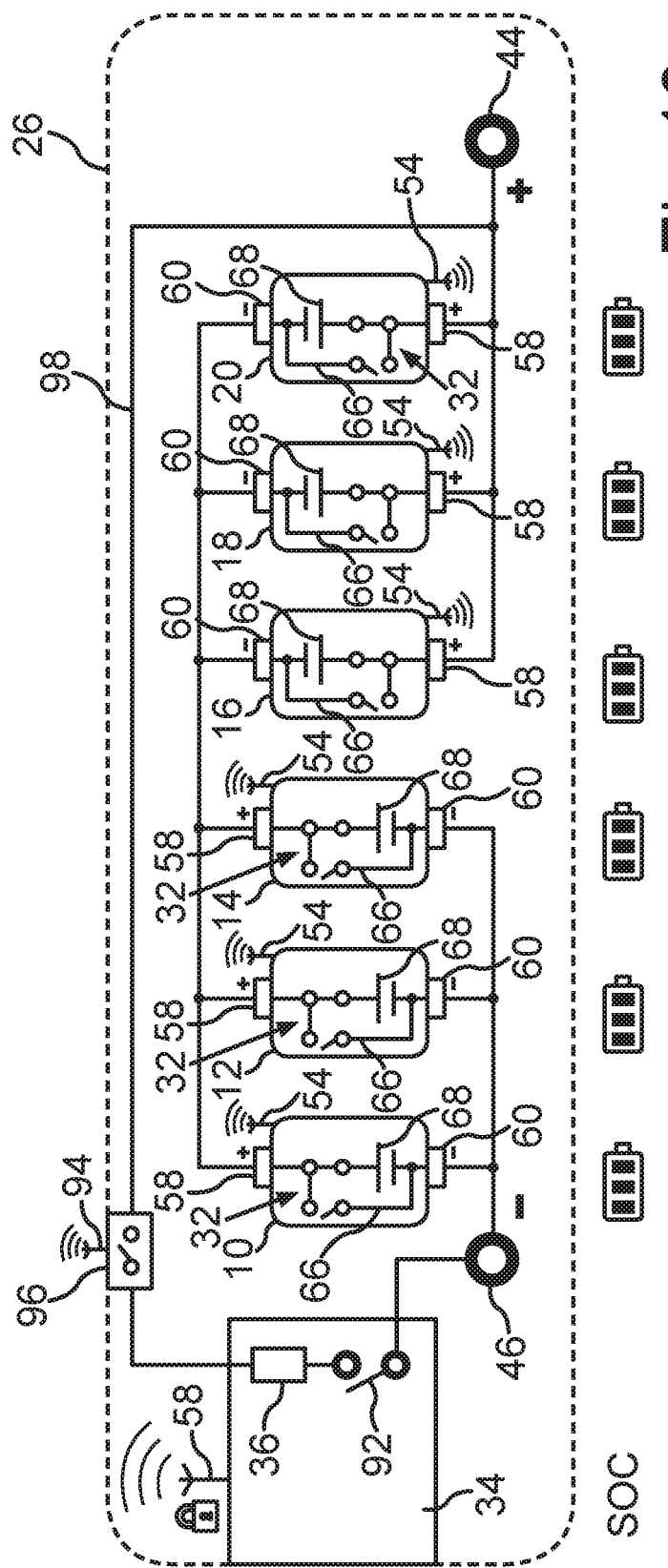
FIG. 13 a schematic block diagram of a second embodiment of a battery module having battery cells connected in parallel and in series during proper operation.

FIG. 13 shows a further embodiment according to the invention, in which battery module 26 in this case has deviating circuitry as compared to battery module 26 from FIGS. 7 to 12. Contrary to this, FIG. 13 shows that battery cells 10 to 14 are connected in parallel, just as battery cells 16 to 20. The battery cells respectively connected in parallel are then connected to the module terminals 44, 46 in series. Otherwise, the setup of battery module 26 corresponds to that of battery module 26 from FIGS. 7 to 12, which is why reference is additionally made to these comments with respect to this.

FIG. 13 shows an operationally ready state of battery module 26. Contrary to the exemplary embodiment according to FIGS. 7 to 12, battery module 26 according to FIG. 13 only provides one-third of the voltage to the module terminals 44, 46, because three of the battery cells 10, 12, 14 or 16, 18, 20 are connected in parallel. With respect to implementing the method according to the invention for sequential discharging of battery cells, details result hereby, which are explained in the following.

Figure 14:
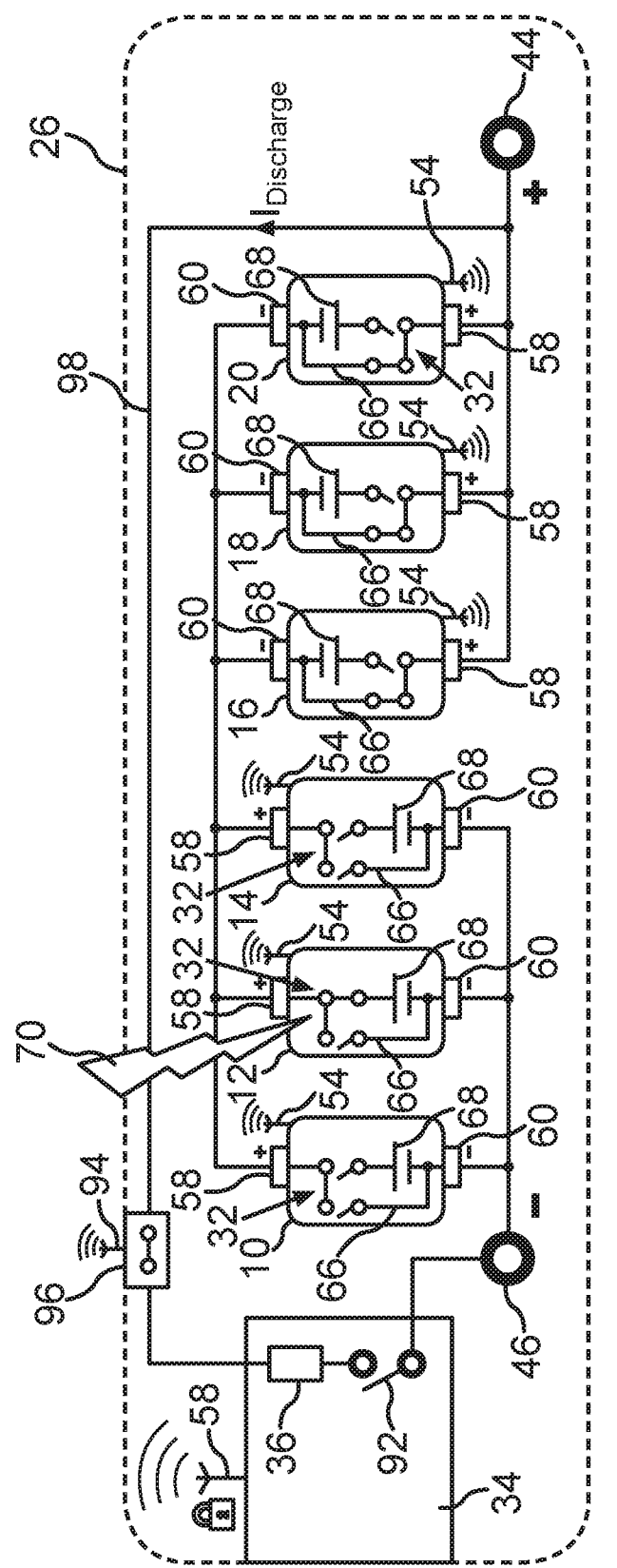
FIG. 14 a failure on a battery cell of the battery module according to FIG. 13.

In the exemplary embodiment according to FIG. 14, the battery cell 12 is affected by a failure 70. In this case, the procedure is that, due to the parallel connection of the battery cells 10, 12, 14, the semiconductor switches 62, 64 of the battery cells 10, 14 are switched to the open state. This means that their galvanic cells 68 are decoupled from the electrical current circuit of battery module 26. The other battery cells 16, 18, 20 are controlled by means of the control unit 48 such that their semiconductor switch 62 switches to the open state, while their semiconductor switch 64 is switched to the closed state. The bypass lines of the battery cells 16, 18, 20 are thereby activated, as with the previous example with respect to FIGS. 7 to 12. The battery cell 12, along with its battery cell connections 58, 60, is then adjacent to the module terminals 44, 46. The battery cell 12 can then be discharged by means of the discharge device 34, as explained in the previous example. Once battery cell 12 is discharged, the further procedure takes place such that first battery cell 14 and then battery cell 10 are discharged, which are arranged directly adjacent to battery cell 12. Only once battery cells 10, 12, 14 are discharged does the further discharging of battery cells 16, 18, 20 take place sequentially, as previously explained. Despite the parallel circuit of battery cells, single-cell discharging according to the invention can be implemented here as well.

Figure 15:
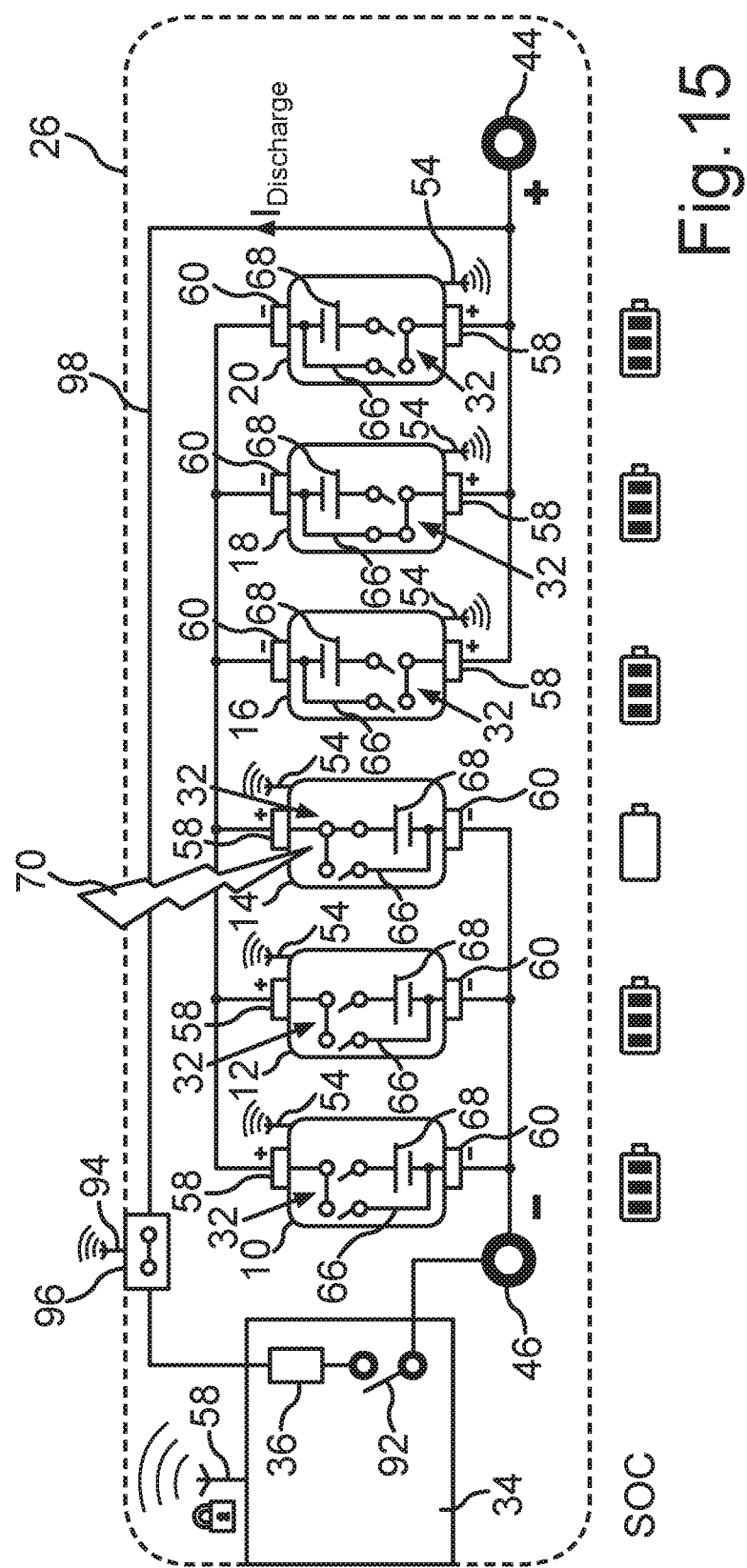
FIG. 15 a third embodiment according to the invention based on the battery module according to FIG. 13, wherein a different battery cell has an impaired state.

FIG. 15 shows a further embodiment of the procedure according to the invention, wherein this exemplary embodiment is based on the exemplary embodiment from FIG. 14. For this reason, reference is additionally made to the comments regarding the exemplary embodiment according to FIG. 14. Deviating from the exemplary embodiment regarding FIG. 14, a failure 70 has occurred at battery cell 14 with the exemplary embodiment according to FIG. 15. The battery module is otherwise identical to that from FIG. 14. A difference emerges with respect to the procedure to the extent that after discharging of battery cell 14 as the predefined battery cell, initially battery cell 12 is discharged, followed by battery cell 16 arranged likewise adjacent to battery cell 14. The discharging of battery cells 10, 18, 20 then takes place individually and sequentially one after the other.

Essentially, the invention does not arbitrarily discharge the battery cells of battery module 26 one after the other but rather based on the determined urgency. The determined urgency results in that one of the battery cells enters an impaired state, which can be determined by means of the control unit. The predefined battery cell is thereby established, starting from which the discharge method according to the invention is executed. The predefined battery cell is discharged as the first by means of the discharge device. The discharging of the other battery cells then follows according to a predefined scheme. This procedure means that the most hazardous states and/or battery cells are discharged first in order to reduce or avoid the hazardous states. For this reason, it is proposed according to an embodiment of the invention that first adjacently arranged battery cells are discharged after the discharging of the predefined battery cell in order to first deactivate the focus of the failure from an energy perspective.

With the exemplary embodiment from FIG. 15, it is further provided that the directly adjacent cells 12, 16 are completely deactivated by opening their semiconductor switches 62, 64. In this manner, the battery cells 12, 16 potentially impacted by battery cell 14 can first be deactivated completely from the electrical switching circuit so that a damaging effect can be extensively prevented. The connection of battery cell 14 to module terminals 44, 46 is effected by means of the bypass lines of battery cells 18, 20.

Figure 16:
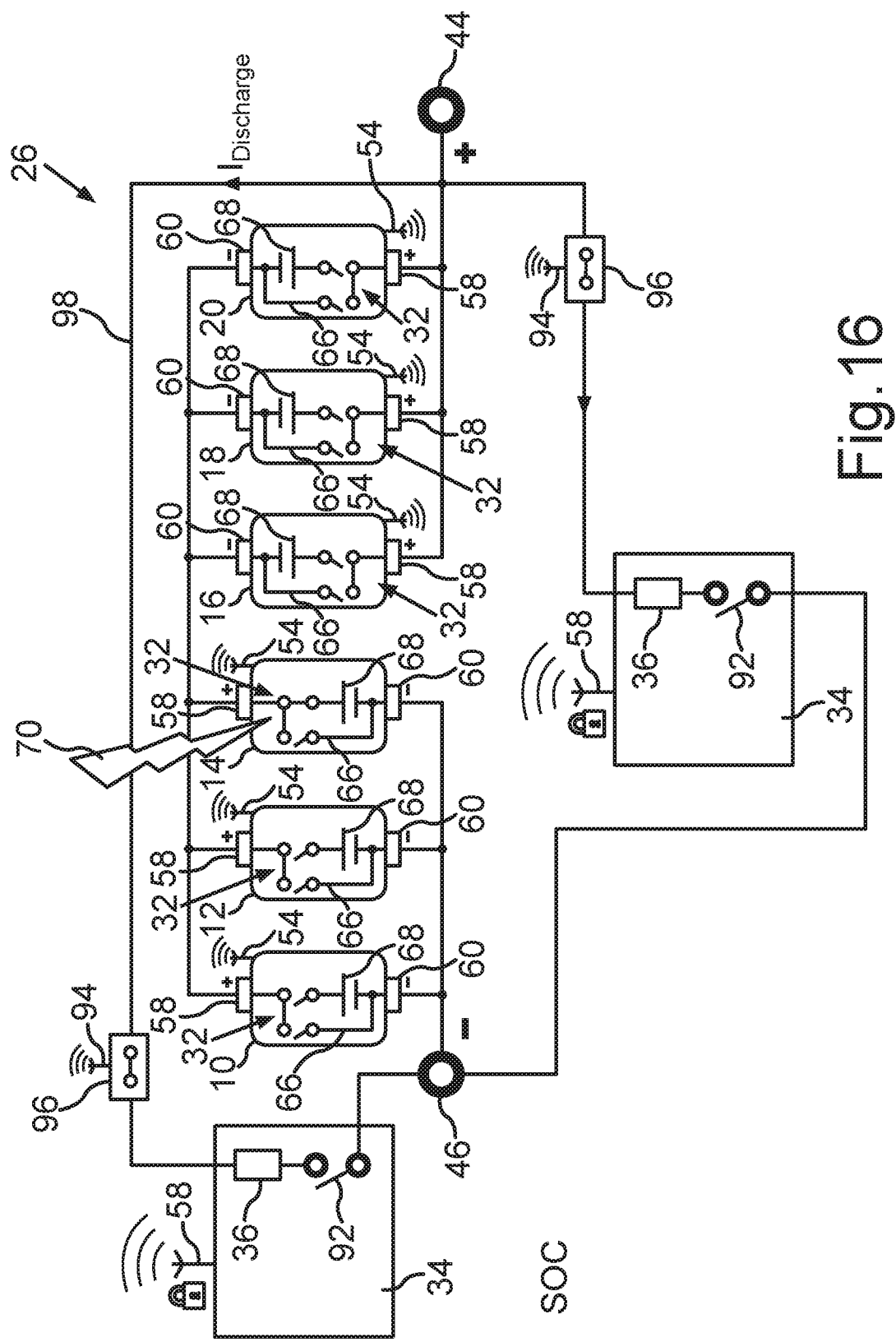
FIG. 16 a discharging of the battery module according to FIG. 15 having two discharge devices connected in parallel according to the invention.

FIG. 16 shows a further embodiment of the invention based on the exemplary embodiment according to FIG. 15, wherein, contrary to the exemplary embodiment according to FIG. 15, with the exemplary embodiment according to FIG. 16, a second discharge device 34 is provided, which is connected in parallel to the module terminals 44, 46, just as the first discharge device 34 from FIG. 15. In this manner, an increased discharge rate can be achieved with respect to the battery cells 10, 12, 14, 16, 18, 20 and thus finally also to battery module 26. Moreover, the heat to be dissipated can be distributed to a larger heatsink in order to distribute released heat energy preferably such that it is removed from the defective battery cell. To this end, a distance to the heatsink is preferably selected to be as large as possible.

Figure 17:
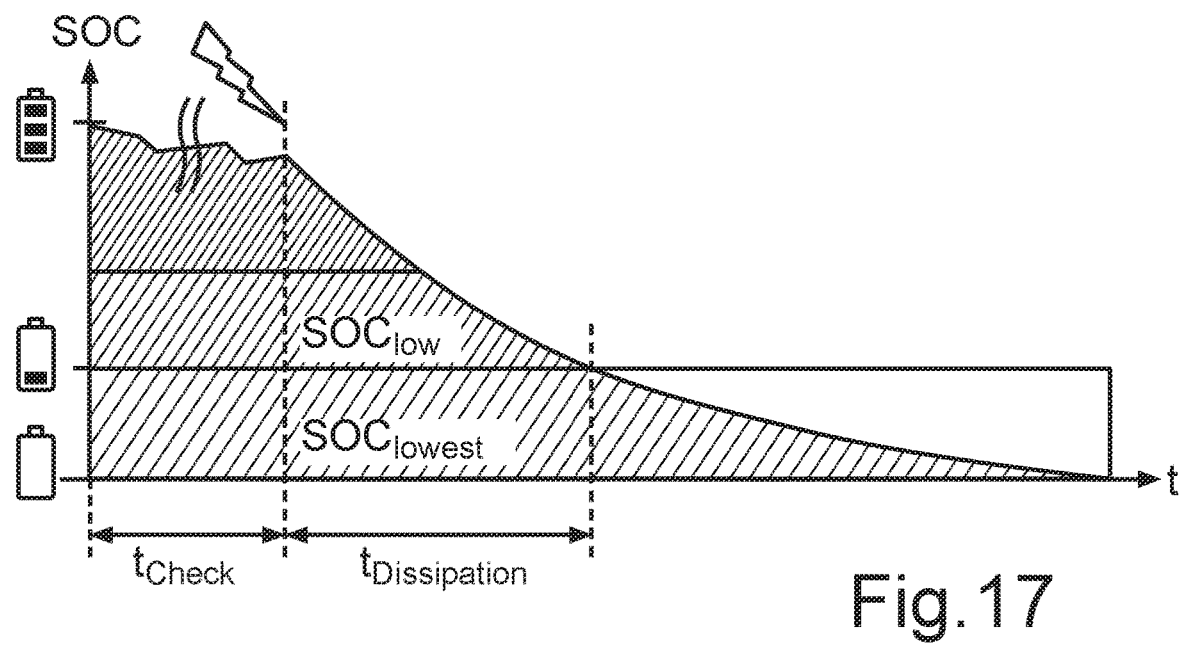
FIG. 17 a diagram of a schematic view of a hazard potential of battery cells as a function of the stored energy.

FIG. 17 shows a schematic diagram of a representation regarding the estimation of the danger of a state of charge of a battery cell in the event of a failure. A time axis is provided as the X axis. The Y axis indicates a current state of charge of a selected battery cell, for example battery cell 10. By means of the cell formed particularly as a smart cell, a continuous monitoring or checking of the battery cells and/or the battery modules can take place by means of the prioritized Smart Safety Detection Unit and its early detection systems, particularly with respect to a long-term behavior of the battery cell, within a timeframe, which is indicated by $t_{check}$ in FIG. 17. In the event that a potential hazardous cell state is detected based on a trend or a situation, an attempt can be made to adjust, in a controlled manner, the battery cells of the affected battery module, particularly its adjacent cells as well, as previously explained, to a nonhazardous state of charge to the extent possible, in the shortest possible time, with the assistance of one or more distributed discharge devices or Smart Power Dissipation Units within a timeframe, which is indicated by $t_{dissipation}$ in FIG. 17. In FIG. 17, the nonhazardous state of charge is indicated by $SOC_{low}$. A state of charge which is below this value is considered to be nonhazardous. The time $t_{dissipation}$ is a function of the performance capability of the discharge device. The electrical energy to be dissipated in this case can be distributed to one or more discharge devices and is preferably converted to heat there. The released heat can also be dissipated individually by means of a cooling system for the entire battery or even with the assistance of a corresponding emergency cooling system. In addition, the respective discharge device can be actuated by the control unit as a function of the current situation so that the electrical energy to be dissipated cannot act as an additional source of heat for the problematic battery cell. In this manner, an additional enhancement of the problem of the impaired battery cell can be prevented. Even if multiple battery cells have failures at the same time, multiple battery modules, for example by means of multiple distributed discharge devices, could be transitioned to the nonhazardous or safe operating state simultaneously with the sequence of the invention. It has proven to be particularly advantageous that time savings can be achieved with the invention in order to detect failure states early on, in particular to enable a forecast for the battery cells and to remove battery cells detected as being impaired from operation as early as possible, in order to prevent a hazardous state for the battery module and/or the battery as a whole.

The discharge devices 34 may be arranged on all sides of the battery module 26, even on the lower side or above the module terminals 44, 46. In addition, it is conceivable for the discharge devices 34 to be arranged at a location far away from the battery module 26 and to connect them electrically to one or more of the battery modules 24, 26, 28 and to ensure corresponding heat dissipation on-site. It is not necessary to switch all battery modules 24, 26, 28 of the battery 30 to a bridge mode. The battery module 26 with the failure can be discharged as previously explained.

In the simplest case, a discharge device according to the invention consists of an electrical resistor 36 and a remote-controllable switching element, such as the semiconductor switch 92, as well as two connections, which are not indicated, however, in the previous exemplary embodiments. The electrical resistor may consist, for example, of a ceramic plate, which can be exposed to a cooling medium, with a vapor-deposited, meander-shaped metal layer, or of the like.

As a whole, the invention results in the following advantages:

Intelligent, smart, programmable, and dynamically adaptable, highly integrated system;

Significant increase in safety, even when using an aggressive battery cell chemistry;

The invention is not only limited to automotive applications but can also be used with stationary energy storage devices;

A Smart Safety Module with active monitoring and an early detection system (Smart Safety Detection System) and one or more distributed high-performance energy dissipation systems, and namely the discharge devices (Smart Power Dissipation Units) for reducing a hazard level are obtained, with which a total discharge can be implemented;

Permanent monitoring of all battery cells of the battery;

Minimization of the risks when using aggressive battery cell chemistries, particularly with future battery cells having very high energy densities;

Use of intelligent early detection systems, particularly for forecasting;

Direct and spontaneous response of the overall system comprising battery modules and battery cells with individual changes of individual battery cells;

Derivation of preventive measures for increasing the overall safety of the battery;

Adaptive learning to reduce the risks by means of intelligent software with dynamic changes of all types, for example aging (State Of Health, SOH), accidents, temperature problems, quick charges, as well as gradual faults, such as, for example, internal short-circuits due to micro-particles and/or the like;

Lowering of the state of charge of the affected battery cell and its adjacent battery cells, including the entire battery module, if necessary even the entire battery, for example in the event of an accident, to a nonhazardous charge level in order to minimize the risk with a pending failure case;

Bypassing of damaged modules or battery cells by means of a bridge function, whereby further operation or emergency operation can be implemented; With a motor vehicle, travel to a workshop, for example, can thereby be enabled;

Even with a total battery system, heat dissipation can be initiated in a short time with a central Smart Power Dissipation Unit, for example by operating an air-conditioning system, a PTC, and/or the like;

One or more Smart Power Dissipation Units can be integrated directly into a battery module and operated in a thermodynamically optimal manner via intelligent actuation;

The invention is also suitable for passive balancing of battery cells and battery modules (bridge function+ switchable battery cells+Smart Power Dissipation Unit);

Temperature adjustment of battery cells and battery modules;

The exemplary embodiments only serve to explain the invention and are not limited to this. The effects and advantages as well as embodiments for the method according to the invention apply equally to the discharge device, battery, and motor vehicle covered with the invention and vice versa. Accordingly, corresponding device features may also be provided for method features and vice versa.

The invention claimed is:

1. A method for discharging of a battery module during failure of the battery module, comprising:
   providing a battery with a plurality of battery modules, each of the plurality of battery modules comprising a plurality of battery cells which are arranged adjacent to one another and mechanically and electrically connected together,
   wherein, in each of the plurality of battery modules, the plurality of battery cells are each individually activated by a cell switch unit in a first switching state to enable an energy storage function and each individually deactivated by the cell switch unit in a second switching state to disable the energy storage function,
   wherein, during a failure of at least one of the plurality of battery modules, the plurality of battery cells contained within those battery modules which have failed are coupled to a discharge device by way of the cell switch unit, and the discharge device individually discharges each of the plurality of battery cells according to a sequence which starts with a predefined battery cell, and
   wherein the discharge device comprises a resistor.

2. The method according to claim 1, wherein, during the failure, the plurality of battery cells contained within those battery modules which have failed are deactivated by the cell switch unit before being coupled to the discharge device.

3. The method according to claim 1, further comprising:
   detecting a state value for each of the plurality of battery cells, and
   evaluating whether each of the state values fall within a predefined value range,
   wherein, when one of the state values is outside of the predefined value range, the corresponding battery cell is designated as the predefined battery cell.

4. The method according to claim 3, wherein designation of the predefined battery cell signals the failure of the at least one of the plurality of battery modules.

5. The method according to claim 1, wherein the sequence is determined according a cell's spatial distance from the predefined battery cell.

6. The method according to claim 3, wherein the sequence is determined according to the state value of each of the plurality of battery cells.

7. The method according to claim 1, wherein the discharge device is common to the plurality of battery modules and connected to terminals of the battery, and
   wherein, during the failure, those battery modules which have failed are likewise individually and sequentially coupled to the discharge device such that only a single battery cell is discharged by the discharge device at a time.

8. The method according to claim 1, wherein discharging a respective battery cell via the discharge device reduces the respective battery cell to a predefined lower state of charge which is greater than a completely discharged state.

9. A battery comprising two battery terminals and a plurality of battery modules,
   wherein each of the plurality of battery modules comprise a plurality of battery cells which are arranged adjacent to one another and mechanically and electrically connected together,
   wherein each of the plurality of battery modules further comprise a cell switch unit, controllable by means of a control unit, and the cell switch unit is configured to, in a first switching state, individually activate each of the plurality of battery cells to enable an energy storage function and to, in a second switching sate, individually deactivate each of the plurality of battery cells to disable the energy storage function,
   wherein, during a failure of at least one of the plurality of battery modules, the control unit is configured to couple the plurality of battery cells contained within those battery modules which have failed to a discharge device by way of the cell switch unit, and the discharge device individually discharges each of the plurality of battery cells according to a sequence which starts with a predefined battery cell, and
   wherein the discharge device comprises a resistor.

10. The method according to claim 2, further comprising:
    detecting a state value for each of the plurality of battery cells, and
    evaluating whether each of the state values fall within a predefined value range,
    wherein, when one of the state values is outside of the predefined value range, the corresponding battery cell is designated as the predefined battery cell.

11. The method according to claim 2, wherein the sequence is determined according a cell's spatial distance from the predefined battery cell.

12. The method according to claim 3, wherein the sequence is determined according a cell's spatial distance from the predefined battery cell.

13. The method according to claim 4, wherein the sequence is determined according a cell's spatial distance from the predefined battery cell.

14. The method according to claim 2, wherein the discharge device is common to the plurality of battery modules and connected to terminals of the battery, and
    wherein, during the failure, those battery modules which have failed are likewise individually and sequentially coupled to the discharge device such that only a single battery cell is discharged by the discharge device at a time.

15. The method according to claim 3, wherein the discharge device is common to the plurality of battery modules and connected to terminals of the battery, and
    wherein, during the failure, those battery modules which have failed are likewise individually and sequentially coupled to the discharge device such that only a single battery cell is discharged by the discharge device at a time.

16. The method according to claim 4, wherein the discharge device is common to the plurality of battery modules and connected to terminals of the battery, and
    wherein, during the failure, those battery modules which have failed are likewise individually and sequentially coupled to the discharge device such that only a single battery cell is discharged by the discharge device at a time.

17. The method according to claim 5, wherein the discharge device is common to the plurality of battery modules and connected to terminals of the battery, and wherein, during the failure, those battery modules which have failed are likewise individually and sequentially coupled to the discharge device such that only a single battery cell is discharged by the discharge device at a time.

18. The method according to claim 6, wherein the discharge device is common to the plurality of battery modules and connected to terminals of the battery, and wherein, during the failure, those battery modules which have failed are likewise individually and sequentially coupled to the discharge device such that only a single battery cell is discharged by the discharge device at a time.

19. The method according to claim 2, wherein discharging a respective battery cell via the discharge device reduces the respective battery cell to a predefined lower state of charge which is greater than a completely discharged state.

20. The method according to claim 1, wherein each of the plurality of battery modules are provided with a dedicated discharge device for discharging the plurality of battery cells contained therein.

* * * * *